US012736355B2

(12) United States Patent
Chinen et al.

(10) Patent No.: US 12,736,355 B2
(45) Date of Patent: Sep. 15, 2026

(54) AD-HOC TRANSPORT NODE FOR TRANSSHIPPING

(71) Applicant: International Business Machines Corporation, Armonk, NY (US)

(72) Inventors: Mitsuru Chinen, Yokohama (JP); Tsend Ochir Bat Ulzii, Edogawa-ku (JP); Akira Saito, Ichikawa (JP); Hirotaka Matsumoto, Zama (JP); Yohkichi Sasatani, Yokohama-city (JP); Kenichi Takasaki, Shibuya (JP); Takeshi Watanabe, Kawasaki (JP); Sanehiro Furuichi, Setagaya-ku (JP)

(73) Assignee: International Business Machines Corporation, Armonk, NY (US)

( * ) Notice: Subject to any disclaimer, the term of this patent is extended or adjusted under 35 U.S.C. 154(b) by 230 days.

(21) Appl. No.: 18/339,092

(22) Filed: Jun. 21, 2023

(65) Prior Publication Data

US 2024/0426618 A1 Dec. 26, 2024

(51) Int. Cl.
*G01C 21/34* (2006.01)
*G01C 21/36* (2006.01)

(52) U.S. Cl.
CPC ..... *G01C 21/3438* (2013.01); *G01C 21/3605* (2013.01)

(58) Field of Classification Search
CPC ............ G01C 21/3438; G01C 21/3605; G01C 21/3658
See application file for complete search history.

(56) References Cited

U.S. PATENT DOCUMENTS 11,231,706 B1 * 1/2022 Curlander ................ B25J 5/005
11,562,300 B2 1/2023 Tulabandhula et al.
(Continued)

FOREIGN PATENT DOCUMENTS

CN 104715296 A 6/2015
CN 110725172 A * 1/2020 ............. E01F 9/615
(Continued)

OTHER PUBLICATIONS https://www.alamy.com/panoramic-aerial-horizontal-view-of-rest-area-truck-stop-on-the-car-parking-endless-interstate-highway-in-desert-arizona-image434862786.html (Year: 2021).*
(Continued)

*Primary Examiner* — Rachid Bendidi
*Assistant Examiner* — Kai N Wang
(74) *Attorney, Agent, or Firm* — Yee & Associates, P.C.

(57) ABSTRACT

A computer implemented method provides transshipping. A number of processor units identifies destination information for a load for a first transport vehicle having a first destination and a second transport vehicle having a second destination. The number of processor units determines a lane definition for an ad-hoc transport node on a road based on predicted locations for the first transport vehicle bound for the first destination and the second transport vehicle bound for the second destination. The lane definition defines a set of transfer lanes for the ad-hoc transport node. The number of processor units transfers the load between the first transport vehicle and the second transport vehicle in response to the first transport vehicle and the second transport vehicle being within the ad-hoc transport node.

20 Claims, 13 Drawing Sheets

(56) References Cited

U.S. PATENT DOCUMENTS

| | | | | |
|---|---|---|---|---|
| 2008/0021747 | A1* | 1/2008 | Moeller | G01C 21/343 705/6 |
| 2011/0109482 | A1* | 5/2011 | Haran | G08G 1/096741 340/995.1 |
| 2015/0269520 | A1* | 9/2015 | Knapp | G06Q 10/08355 705/338 |
| 2017/0267267 | A1* | 9/2017 | Bollapragada | B61L 27/16 |
| 2018/0281657 | A1* | 10/2018 | Healey | B25J 9/1697 |
| 2018/0341819 | A1* | 11/2018 | Rössler | B60W 30/18163 |
| 2019/0244157 | A1 | 8/2019 | Anderson et al. | |
| 2019/0360826 | A1 | 11/2019 | Hosokawa et al. | |
| 2019/0392712 | A1* | 12/2019 | Ran | G08G 1/0116 |
| 2020/0031340 | A1* | 1/2020 | Tao | B60W 30/0956 |
| 2021/0005085 | A1* | 1/2021 | Cheng | G08G 1/012 |
| 2022/0234845 | A1* | 7/2022 | Lee | B65G 67/60 |
| 2022/0398517 | A1 | 12/2022 | Watanabe et al. | |
| 2023/0154320 | A1 | 5/2023 | Sasatani et al. | |
| 2024/0005789 | A1* | 1/2024 | Kasuga | G08G 1/20 |
| 2024/0071232 | A1* | 2/2024 | Lu | G06Q 10/06315 |

FOREIGN PATENT DOCUMENTS

| | | | |
|---|---|---|---|
| CN | 115271276 | A | 11/2022 |
| JP | 2022158705 | A | 10/2022 |

OTHER PUBLICATIONS

Nagase et al., "A study on development of transport hub with public transport reorganization Focusing on composited transportation facility," Journal of the City Planning Institute of Japan, vol. 53, No. 3, Oct. 2018, 8 pages. https://www.jstage.jst.go.jp/article/journalcpij/53/3/53_565/_article/-char/ja/.

* cited by examiner

AD-HOC TRANSPORT NODE FOR TRANSSHIPPING

BACKGROUND

The disclosure relates generally to a computer system and more specifically to transferring passengers and cargo between transport vehicles using ad-hoc transfer zones.

Public transportation networks are typically found in denser or more populated areas such as urban areas in cities. Public transportation is provided to less dense population areas by operating train or bus lines that extend from a city center such as a station or downtown area to a suburban area. These lines typically are designed in a radial or spoke fashion. Public transport nodes can be placed along these line in suburban areas. These public transport nodes are locations such as bus stops where buses can pick up and drop off passengers. The public transport nodes can also include transit centers or hubs where different types of transport are present that can transfer passengers between these different types of transportation. For example, a transit center can include a bus terminal, a subway, or a train station. Passengers can move from larger size vehicles such as a tram, a city bus, or train, to smaller size vehicles such as on-demand buses or shared taxis.

SUMMARY

According to one illustrative embodiment, a computer implemented method provides transshipping. A number of processor units identifies destination information for a load for a first transport vehicle having a first destination and a second transport vehicle having a second destination. The number of processor units determines a lane definition for an ad-hoc transport node on a road based on predicted locations for the first transport vehicle bound for the first destination and the second transport vehicle bound for the second destination. The lane definition defines a set of transfer lanes for the ad-hoc transport node. The number of processor units transfers the load between the first transport vehicle and the second transport vehicle in response to the first transport vehicle and the second transport vehicle being within the ad-hoc transport node. According to other illustrative embodiments, a computer system and a computer program product for transshipping are provided.

DETAILED DESCRIPTION

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 1:
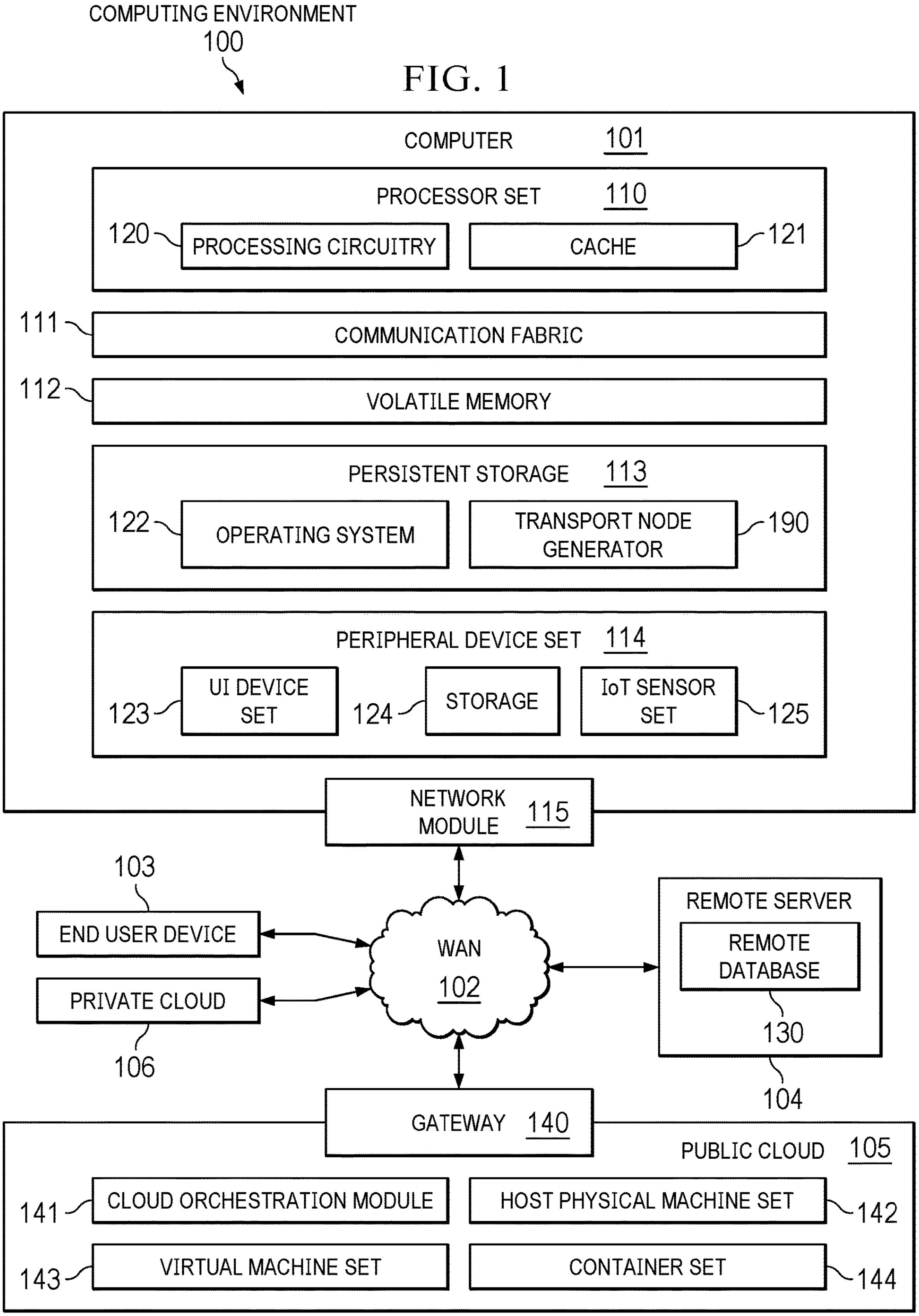
FIG. 1 is a block diagram of a computing environment in accordance with an illustrative embodiment.

With reference now to the figures in particular with reference to FIG. 1, a block diagram of a computing environment is depicted in accordance with an illustrative embodiment. Computing environment 100 contains an example of an environment for the execution of at least some of the computer code involved in performing the inventive methods, such as transport node manager 190. In addition to transport node manager 190, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and transport node manager 190, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in transport node manager 190 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in transport node manager 190 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

The illustrative embodiments recognize and take into account a number of different considerations as described herein. For example, a radial or spoke architecture for operating bus lines can be inefficient because of the lower demand that is typically found in suburban areas. Further, building new public transport nodes can be more difficult and expensive than desired with the need to ensure adequate space for transferring passengers and for passengers waiting for transportation. Additionally, the use of on-demand buses and shared taxis on a route that will be changed frequently based on passenger demand can result in a route that becomes longer than desired for passengers. As result, decreased passenger the satisfaction can occur.

Thus, the illustrative example provides a computer implemented method, apparatus, system, and computer program product for transshipping loads. A load can be transferred from one transport vehicle to another transport vehicle based on the destination of the load during movement of the vehicles in a transfer zone. In one illustrative example, a computer implemented method provides transshipping. A number of processor units identifies destination information for a load for a first transport vehicle having a first destination and a second transport vehicle having a second destination. The number of processor units determines a lane definition for an ad-hoc transport node on a road based on predicted locations for the first transport vehicle bound for the first destination and the second transport vehicle bound for the second destination. The lane definition defines a set of transfer lanes for the ad-hoc transport node. The number of processor units transfers the load between the first transport vehicle and the second transport vehicle in response to the first transport vehicle and the second transport vehicle being within the ad-hoc transport node.

As used herein, a "set of" when used with reference to items means one or more items. For example, a set of transfer lanes is one or more transfer lanes.

These ad-hoc transport nodes are temporary transfer zones that can be created on a temporary basis and can also move while the ad-hoc transport nodes are active. As a result, these ad-hoc transport nodes provide an ability to transfer loads between transport vehicles without the need to build permanent infrastructure for these transfers. This type of transfer of loads for transshipping can be performed for loads in the form of passengers, cargo objects, or both.

Figure 2:
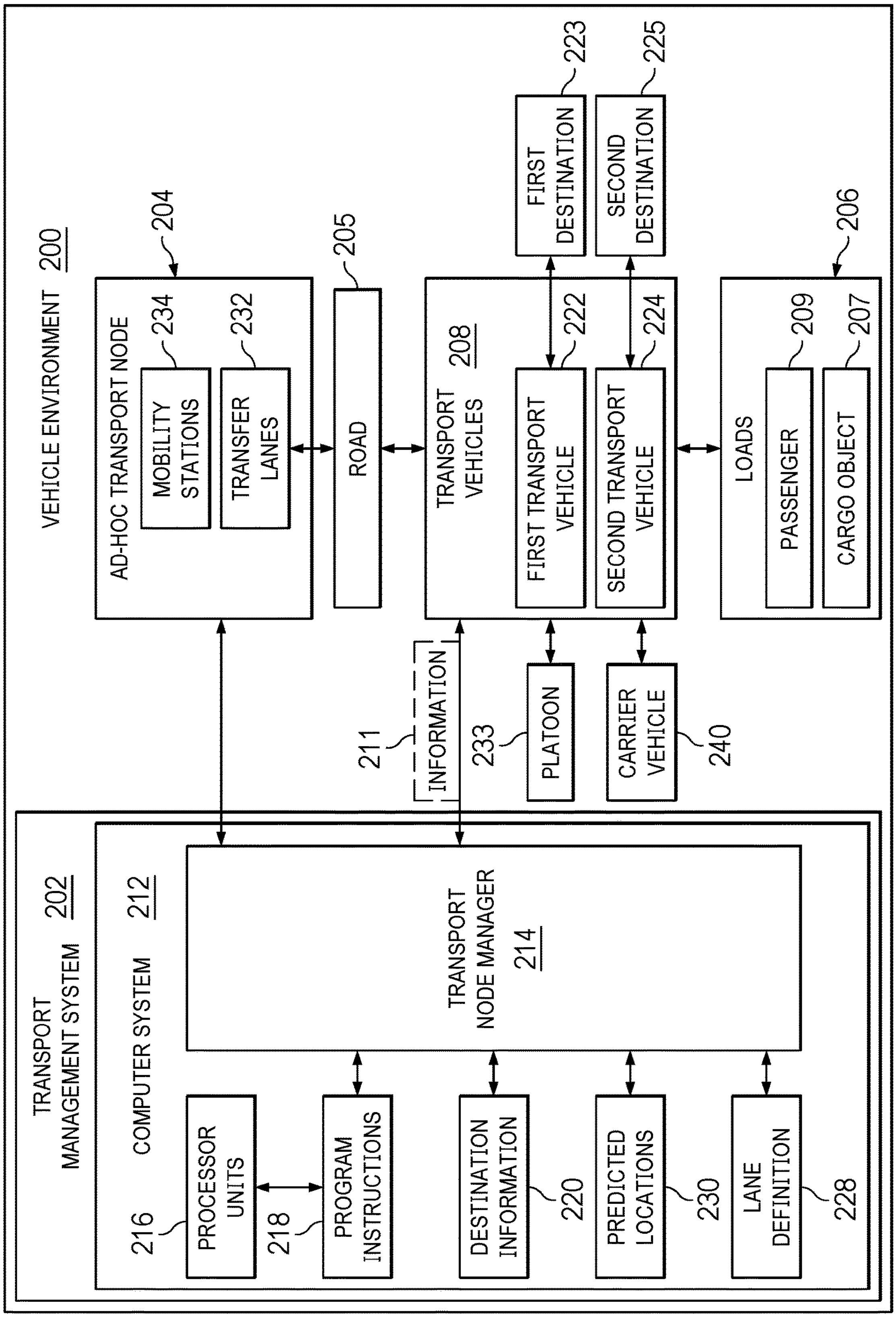
FIG. 2 is a block diagram of a transportation environment in accordance with an illustrative embodiment.

With reference now to FIG. 2, a block diagram of a transportation environment is depicted in accordance with an illustrative embodiment. In this illustrative example, vehicle environment 200 includes components that can be implemented in hardware such as the hardware shown in computing environment 100 in FIG. 1.

In this illustrative example, transport management system 202 can operate to identify ad-hoc transport node 204 for use in transferring a set of loads 206 between transport vehicles 208. In the illustrative examples, a transport node is a location or area where loads 206 can be transferred from one vehicle to another vehicle. Ad-hoc transport node 204 is a temporary location where loads 206 can be transferred directly from one vehicle to another vehicle. In this illustrative example, ad-hoc transport node 204 is a temporary location on road 205 at which the set of loads 206 can be transferred between transport vehicles 208.

In other words, ad-hoc transport node 204 is created for transferring loads on a temporary basis and can be dissolved or removed after the set of loads 206 has been transferred between transport vehicles 208. Further, ad-hoc transport node 204 can be a dynamic transport node. In other words, ad-hoc transport node 204 can move on road 205.

In this example, the set of loads 206 can be selected from at least one of a passenger 209 or cargo object 207. As used herein, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combination of these items can be present. In some illustrative examples, "at least one of" can be, for example, without limitation, two of item A; one of item B; and ten of item C; four of item B and seven of item C; or other suitable combinations. In other words, the set of loads 206 can be one or more passengers, one or more cargo objects, or a combination thereof.

In this illustrative example, transport management system 202 is comprised of a number of different components. As depicted, transport management system 202 comprises computer system 212 and transport node manager 214. Transport node manager 214 may be implemented using transport node manager 190 in FIG. 1.

Transport node manager 214 can be implemented in software, hardware, firmware or a combination thereof. When software is used, the operations performed by transport node manager 214 can be implemented in program instructions configured to run on hardware, such as a processor unit. When firmware is used, the operations performed by transport node manager 214 can be implemented in program instructions and data and stored in persistent memory to run on a processor unit. When hardware is employed, the hardware can include circuits that operate to perform the operations in transport node manager 214.

In the illustrative examples, the hardware can take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

As used herein, "a number of" when used with reference to items, means one or more items. For example, "a number of operations" is one or more operations.

Computer system 212 is a physical hardware system and includes one or more data processing systems. When more than one data processing system is present in computer system 212, those data processing systems are in communication with each other using a communications medium. The communications medium can be a network. The data processing systems can be selected from at least one of a computer, a server computer, a tablet computer, or some other suitable data processing system.

As depicted, computer system 212 includes a number of processor units 216 that are capable of executing program instructions 218 implementing processes in the illustrative examples. In other words, program instructions 218 are computer readable program instructions.

As used herein, a processor unit in the number of processor units 216 is a hardware device and is comprised of hardware circuits such as those on an integrated circuit that respond to and process instructions and program code that operate a computer. A processor unit can be implemented using processor set 110 in FIG. 1. When the number of processor units 216 executes program instructions 218 for a process, the number of processor units 216 can be one or more processor units that are in the same computer or in different computers. In other words, the process can be distributed between processor units 216 on the same or different computers in computer system 212.

Further, the number of processor units 216 can be of the same type or different type of processor units. For example, the number of processor units 216 can be selected from at least one of a single core processor, a dual-core processor, a multi-processor core, a general-purpose central processing unit (CPU), a graphics processing unit (GPU), a digital signal processor (DSP), or some other type of processor unit.

In this illustrative example, transport node manager 214 can facilitate transshipping of loads 206 between transport vehicles 208. In other words, transport node manager 214 can create ad-hoc transport node 204 for use in moving or transferring loads between transport vehicles 208.

In one illustrative example, transport node manager 214 identifies destination information 220 for a set of loads 206 for first transport vehicle 222 in transport vehicles 208 having first destination 223 and second transport vehicle 224 in transport vehicles 208 having second destination 225.

These destinations can be, for example, a transport node, a bus station, a train station, an office building, a terminal, a depot, a code, or other location, wherein the first transport vehicle and the second transport vehicle are selected from at least one of an autonomous vehicle, a truck, a bus, a city bus, a long distance bus, a coach, a courtesy car, a van, a minibus, or a tram.

Transport node manager 214 can identify destination information 220 in a number of different ways. For example, this destination information can be received directly from passenger 209 in loads 206. In another example, destination information 220 can be an itinerary, a shipping document, or other information. This information also can be identified in a database or received from a third party shipping cargo object 207.

Transport node manager 214 determines lane definition 228 for ad-hoc transport node 204 on road 205 based on predicted locations 230 for first transport vehicle 222 bound for first destination 223 and the second transport vehicle bound for the second destination 225. Predicted locations 230 can be based on routes identified for first destination 223 and the second transport vehicle bound for the second destination 225 and current locations of these transport vehicles. These types of predictions can be made using currently available navigation applications that provide real-time traffic in directions used to navigate from one location to another location.

In one illustrative example, when a transport vehicle is bound for a destination, the transport vehicle is scheduled to or intended to travel to that destination. In another illustrative example, a transport vehicle can be bound for a destination when the transport vehicle is already in enroute or traveling to the destination.

In this example, lane definition 228 defines a set of transfer lanes 232 for ad-hoc transport node 204. The set of transfer lanes form a transfer zone for ad-hoc transport node 204. The set of transfer lanes 232 can be based on physical lanes or virtual lanes on road 205. In other words, lane definition 228 can define the set of transfer lanes 232 using physical lanes marked on road 205. In another example, lane definition 228 can define the set of transfer lanes 232 using virtual lanes that are not physically marked. The lanes can be defined and sent to transport vehicles 208. Lane definition 228 can include at least one of an optimum number of lanes for the set of transfer lanes 232, a width of respective lanes, a lane type, a length of set of transfer lanes 232, or other information.

Further, lane definition 228 can also define movement of the set of transfer lanes on road 205. For example, the speed at which the set of transfer lanes move can be based on the speed of transport vehicles 208 that will transfer loads 206 using transfer lanes 232 on road 205. Transport node manager 214 can transfer the set of loads 206 between first transport vehicle 222 and second transport vehicle 224 in response to first transport vehicle 222 and second transport vehicle 224 being within ad-hoc transport node 204.

In this illustrative example, the transferring of the set of loads 206 between first transport vehicle 222 and second transport vehicle 224 occurs with first transport vehicle 222 and second transport vehicle 224 driving as platoon 233 within the ad-hoc transport node. With platoon 233, transport vehicles 208 travel closely together in a coordinated manner. With autonomous vehicles, these autonomous vehicles can travel in a formation with minimal gaps between the autonomous vehicles using various communication control systems to maintain synchronize movement of the autonomous and desired safety.

In this example, transport node manager 214 performs transfers of the set of loads 206 by sending information 211 to transport vehicles 208. This information can include, for example, data, commands, program code, and other types of instructions that can be used to perform the transfer of the set of loads 206.

For example, loads 206 can be transferred between first transport vehicle 222 and second transport vehicle 224 using information 211 sent to these transport vehicles. Information 211 can take various forms. For example, information 211 can be selected from at least one of data, commands, program code, digital instructions, text instructions, audio instructions, or other types of information.

Information 211 can be processed by the first transport vehicle 222 and second transport vehicle 224 initiate transfer of loads 206. For example, first transport vehicle 222 and second transport vehicle 224 can display instructions to passenger 209 using information 211. In other illustrative examples, first transport vehicle 222 and second transport vehicle 224 can initiate automatic movement of cargo object 207 on a conveyor belt. In another example, first transport vehicle 222 and second transport vehicle 224 can give instructions to a crewmember on one of first transport vehicle 222 and second transport vehicle 224 to transfer cargo object 207 between first transport vehicle 222 and second transport vehicle 224.

In this illustrative example, the transfer of the set of loads 206 can be performed while first transport vehicle 222 and second transport vehicle 224 are both moving. The movement of these transport vehicles picked can be coordinated based on instructions to these transport vehicles when first transport vehicle 222 and second transport vehicle 224 autonomous vehicles. A walkway or platform can be extended between the transport vehicles to facilitate the transfer of set of loads 206 while these transport vehicles are moving on the set of the set of transfer lanes 232 on road 205 within ad-hoc transport node 204. In other illustrative examples, both first transport vehicle 222 and second transport vehicle 224 can stop within ad-hoc transport node 204 to transfer loads 206.

In one illustrative example, the transfer of the set of loads 206 can be performed by moving the set of loads 206 from first transport vehicle 222 to second transport vehicle 224 in response to the set of loads 206 destined for second destination 225 and first transport vehicle 222 and second transport vehicle 224 being within ad-hoc transport node 204. In another illustrative example, the transfer of the set of loads 206 can be performed by moving the set of loads 206 from second transport vehicle 224 to first transport vehicle 222 in response to set of loads 206 being destined for first destination 223 and first transport vehicle 222 and second transport vehicle 224 being within ad-hoc transport node 204.

In some illustrative examples, a set of mobility stations 234 can be present in ad-hoc transport node 204. The set of mobility stations 234 can be selected from at least one of a mobile shop, a mobile restaurant, a food truck, or other platform that can be used by passengers such as passenger 209. The set of mobility stations can be present when a direct transfer between first transport vehicle 222 and second transport vehicle 224 cannot occur.

With the use of mobility stations 234, the set of loads 206 can be transferred by moving the set of loads 206 that are located on first transport vehicle 222 and are destined for second destination 225 to the set of mobility stations 234 in response to the first transport vehicle being within the ad-hoc transport node with the mobility station. The set of loads 206 can be moved from the set of mobility stations 234 to second transport vehicle 224 in response to second transport vehicle 224 being within ad-hoc transport node 204. As result, both first transport vehicle 222 and second transport vehicle 224 do not need to be within ad-hoc transport node 204 at the same time to transfer the set of loads 206 between these transport vehicles. This example is an indirect transfer of the set of loads 206. The set of mobility stations 234 provides an ability for the set of loads 206 to wait within ad-hoc transport node 204 until second transport vehicle 224 enters ad-hoc transport node 204.

In this example, the set of mobility stations 234 can move in transfer lanes 232 or can be stationary in transfer lanes 232. If transfer lanes 232 are dynamic and move along 204, the set of mobility stations 234 can move on transfer lanes 232. In other examples, the set of transfer lanes 232 can become stationary until second transport vehicle 224 is approaching the set of transfer lanes 232 within ad-hoc transport node 204. In response to the approach of second transport vehicle 224, the set of transfer lanes 232 can move at a speed desired for the set of loads 206 move from set of mobility stations 234 to second transport vehicle 224.

In yet another illustrative example, vehicle carrier 240 can be used to facilitate the transfer of the set of loads 206 between first transport vehicle 222 and second transport vehicle 224. In this example, vehicle carrier 240 can be, for example, a vehicle trailer, a vehicle transport truck, or other suitable vehicle that can carry transport vehicles 208. In this example, vehicle carrier 240 can have a flatbed with a ramp that enables a transport vehicle to be loaded or move on to vehicle carrier 240 while vehicle carrier 240 and the transport vehicle or both moving.

For example, first transport vehicle 222 can be loaded onto vehicle carrier 240 while first transport vehicle 222 and vehicle carrier 240 are both moving within ad-hoc transport node 204. Second transport vehicle 224 can be loaded onto vehicle carrier 240 while second transport vehicle 224 and vehicle carrier 240 are both moving within ad-hoc transport node 204. The set of loads 206 is transferred between first transport vehicle 222 and second transport vehicle 224 while first transport vehicle 222 and second transport vehicle 224 are located on vehicle carrier 240.

Further in this example, first transport vehicle 222 is unloaded from vehicle carrier 240 in response to transferring the set of loads 206. Second transport vehicle 224 is unloaded from vehicle carrier 240 in response to transferring the set of loads 206.

In these illustrative examples, vehicles not involved in transferring set of loads 206 can be prohibited from using set of transfer lanes 232 in response to lane definition 228 being active. Vehicles not involved in transferring set of loads 206 can be allowed to use the set of transfer lanes 232 in response to lane definition 228 not being active. In other words, other vehicles can be prevented from entering ad-hoc transport node 204 while ad-hoc transport node 204 is present on road 205. For example, instructions or messages can be sent to heads up displays, navigation applications, or other software or computing devices in the vehicles to indicate the presence of ad-hoc transport node 204. When the other vehicles are autonomous vehicles, instructions can be sent to those autonomous vehicles identifying the presence of ad-hoc transport node 204 and the extent or dimensions set of transfer lanes 232 in ad-hoc transport node 204.

In one illustrative example, one or more solutions are present that overcome a problem with providing transport nodes to provide desired coverage for transferring loads such as passengers and cargo object between different transport vehicles. As a result, one or more technical solutions provide ad-hoc transport nodes that can be created on a temporary basis for transferring loads between transport vehicles. These ad-hoc transport nodes can be removed once the transfer has occurred. Additionally, the ad-hoc transport nodes can be dynamic and move to facilitate the transfer of loads between transport vehicles. In these illustrative examples, these ad-hoc transport nodes can be especially useful with autonomous vehicles.

Computer system 212 can be configured to perform at least one of the steps, operations, or actions described in the different illustrative examples using software, hardware, firmware or a combination thereof. As a result, computer system 212 operates as a special purpose computer system in which transport node manager 214 in computer system 212 enables transshipping loads between transport vehicles. In particular, transport node manager 214 transforms computer system 212 into a special purpose computer system as compared to currently available general computer systems that do not have transport node manager 214. Transport node manager 214 can create lane definitions for ad-hoc transport node on a road that is used to transfer loads between transport vehicles. This ad-hoc transport node is a temporary transport node and can also move to facilitate transshipping of loads between transport vehicles.

In the illustrative example, the use of transport node manager 214 in computer system 212 integrates processes into a practical application for transshipping loads between transport vehicles. In other words, transport node manager 214 in computer system 212 is directed to a practical application of processes integrated into transport node manager 214 in computer system 212 that generates a lane definition for an ad-hoc transport node and transfers a set of loads between transport vehicles based on the destinations of the set of loads within the ad-hoc transport node.

The illustration of vehicle environment in FIG. 2 is not meant to imply physical or architectural limitations to the manner in which an illustrative embodiment can be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, transport node manager 214 can generate lane definitions for one or more ad-hoc transport nodes in addition to or in place of ad-hoc transport node 204. These ad-hoc transport nodes can be on the same or different road from road 205. Although described with respect autonomous vehicles, This type of transfer can also be performed with transport vehicles that have drivers in the transport vehicles or are remotely piloted. With these types of transport vehicles, a semi-autonomous or autonomous mode can be used to perform the transfer of loads.

Figure 3:
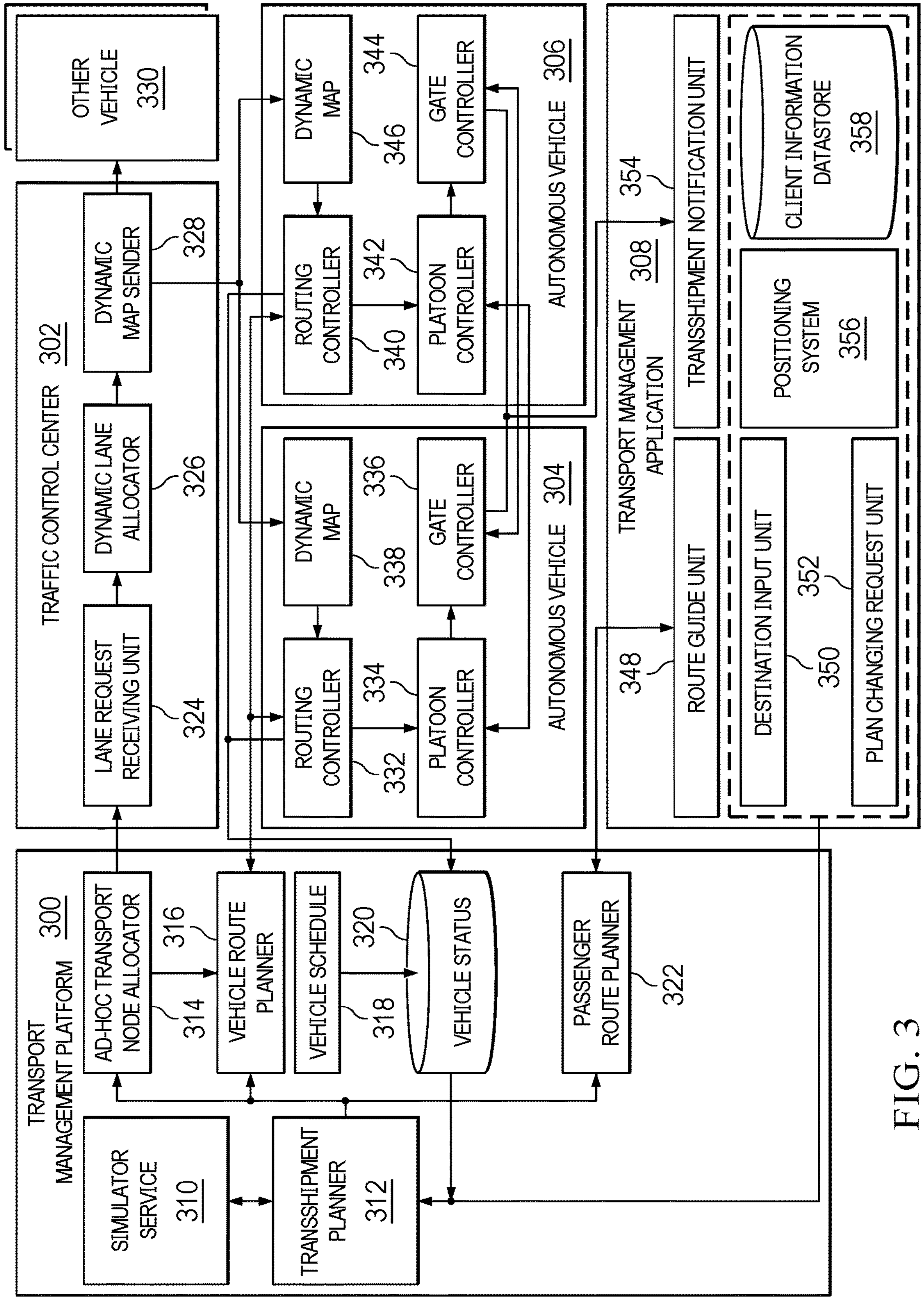
FIG. 3 is an illustration of an ad-hoc transfer system in accordance with an illustrative embodiment.

With reference next to FIG. 3, an illustration of an ad-hoc transfer system is depicted in accordance with an illustrative embodiment. In this illustrative example, FIG. 3 shows example more detailed example components that can be used to implement transport management system 202 in FIG. 2.

In this example, transport management platform 300 is an example of a mobility as a service platform (MaasP) and operates to facilitate transporting passengers to different locations. As depicted in this example, autonomous vehicle 304 and autonomous vehicle 306 are transport vehicles used to transport passengers.

This transportation includes transferring of passengers between autonomous vehicle 304 and autonomous vehicle 306 with the use of ad-hoc nodes. In this illustrative example, transport management platform 300 can be an example of transport management system 202 in FIG. 2. In addition, passengers are example of passenger 209 in FIG. 2, and autonomous vehicle 304 and autonomous vehicle 306 are examples of first transport vehicle 222 and second transport vehicle 224 in FIG. 2.

In this illustrative example, transport management application 308 to interact with other components such as transport management platform 300, autonomous vehicle 304, and autonomous vehicle 306 to manage the planning and implementation of travel by passengers use this application. Passengers can make use of this application to plan and request travel to different locations.

Transport management application 308 includes destination input unit 350, plan changing request unit 352, positioning system 356, and client information datastore 358. In this example, destination input unit 350 is a user interface that receives input from passengers and initiates planning the placement of ad-hoc transport nodes. The input from passengers can include destinations, departure times, locations of passengers detected by positioning system 356, and any information related to the passengers that can be used to initiate a transfer between vehicles. In this illustrative example, destination input unit 350 sends a request to transshipment planner 312 in transport management platform 300 to start a transfer after receiving inputs from a passenger.

As depicted, plan changing request unit 352 is a user interface used to receive requests from passengers to modify trip plans. Passengers can modify trip plans by the user input for perform actions such as changing destination, adding waypoints, or cancelling transfer. In this example, plan changing request unit 352 sends a request to transshipment planner 312 in transport management platform 300 to modify a trip plan for a passenger in response to receiving an input from the passenger.

Transport management application 308 also includes client information datastore 358 in a storage device or system that stores client information for passengers that can be used to plan ad-hoc transport nodes and passenger transfers between vehicles at these nodes. The stored in client information datastore 358 can include, for example, driver license number, facility membership information, historical transfers, user preferences, and other flight information. In this depicted example, client information datastore 358 can send client information to transshipment planner 312 with the requests for starting or modifying transfers.

In addition, transport management application 308 also includes route guide unit 348 and transshipment notification unit 354. In this illustrative example, route guide unit 348 is a user interface that can provide instructions to passengers on how transfers can be accomplished and transshipment notification unit 354 can be used to send notifications with information related to transfers to passengers. For example, transshipment notification unit 354 can notify passengers of delays, cancellations, or instructions for completing transfers.

Transport management platform 300 includes transshipment planner 312, ad-hoc transport node allocator 314, vehicle route planner 316, and passenger route planner 322. In this illustrative example, transshipment planner 312, ad-hoc transport node allocator 314, vehicle route planner 316, and passenger route planner 322 can be examples of components for transport node manager 214 in FIG. 2.

As depicted, transshipment planner 312 receives requests from transport management application 308. Transshipment planner 312 can be used to determine transfer plans that include routes and schedules for transport vehicles. Further, transshipment planner 312 can also be used to determine trip plans for passengers. In this illustrative example, transshipment planner 312 manages the overall planning of transportation. For example, transshipment planner 312 can manage the planning of ad-hoc transport nodes, the operation of each vehicle, the trip plans for passengers, and other components in the transportation system.

The other planning components such as vehicle route planner 316 and passenger route planner 322 manage specific trip plans or routing of specific entities. For example, vehicle route planner 316 can manage the trip plans or routing each of the autonomous vehicles individually. In a similar fashion, passenger route planner 322 can manage specific travel or trip plans for each passenger individually. These components can interact with each other to manage the routing of autonomous vehicles and trips for passengers.

For example, assuming that one of the autonomous vehicles becomes delayed after trip plans are already created for passengers. Transshipment planner 312 coordinates the entire system by requesting to change the location of ad-hoc transport nodes through the ad-hoc transport node allocator 314 and instructs each autonomous vehicle to adjust its route and schedule, as well as notifying passengers of trip plan changes. These changes to individual autonomous vehicles managed through vehicle route planner 316 and changes to trips for passengers can be managed by passenger route planner 322.

As a result, transshipment planner 312 sends requests for placing or removing transfer lanes based on each passenger's request and the operation status of each transport vehicle. These transfer lanes are defined for ad-hoc transport nodes to as locations transferring passengers between vehicles to enable the passengers to reach desired transport destinations. In this illustrative example, transshipment planner 312 sends requests for placing or removing transfer lanes to ad-hoc transport node allocator 314.

Ad-hoc transport node allocator 314 creates definitions for ad-hoc transport nodes and records requests to traffic control center 302 to ad-hoc transport nodes with the transfer lanes based on these definitions. Further, ad-hoc transport node allocator 314 sends requests to vehicle route planner 316 to determine routes and schedules for each transport vehicle to facilitate the transfer of passengers at the ad-hoc transport nodes.

In this illustrative example, transshipment planner 312 sends trip plans for transport vehicles to vehicle route planner 316. Vehicle route planner 316 uses the trip plans received from transshipment planner 312 to determine route and schedule for each transport vehicle involved in transfers.

In a similar fashion, transshipment planner 312 sends trip plans for passengers to passenger route planner 322. Passenger route planner 322 uses the trip plans received from transshipment planner 312 to determine travel route for each passenger. In this illustrative example, travel route for each passenger can include when to information about departure time, departure location, transfer location, a transfer location at transport node to transfer between transport vehicles, and transfer schedule for transferring between vehicles. In this example, passenger route planner 322 sends travel route for each passenger to route guide unit 348. This travel route can also be referred to as an itinerary for the passengers.

In one illustrative example, transshipment planner 312 uses vehicle status 320 to dynamically update routes and schedules for transport vehicles involved in transfers. In this example, vehicle status 320 includes real time operation status for each transport vehicle involved in transfers. For example, vehicle status 320 can include delays, accidents, and planned schedule for the transport vehicles retrieved from vehicle schedule 318.

Further, transshipment planner 312 can also utilize simulator service 310 to determine routes and schedules for transport vehicles involved in transfers. Simulator service 310 is an optional component and can be used to predict or plan the best route and schedule for vehicles. In this illustrative example, the information provided by simulator service 310 can include information related transfer time, transfer cost, and Environmental, Social and Governance (ESG) factors such as carbon emissions, energy consumptions, and waste management.

As depicted, ad-hoc transport node allocator 314 sends requests to traffic control center 302 for create and remove transfer lanes for the ad-hoc transport nodes. In this illustrative example, traffic control center 302 includes lane request receiving unit 324, dynamic lane allocator 326, and dynamic map sender 328. Lane request receiving unit 324 is an interface used to receive requests from ad-hoc transport node allocator 314. Upon receiving a request from ad-hoc transport node allocator 314, traffic control center 302 uses dynamic lane allocator 326 to manage transfer lanes based on location, length, and width defined for the transfer lanes. In this example, dynamic lane allocator 326 can place transfer lanes, rearrange transfer lanes, and remove transfer lanes for an ad-hoc transport node. Further, these transfer lanes can move dynamically on the road. For example, the transfer lane can move along the road at a certain speed depending on the particular definition for an ad-hoc transport node.

Dynamic lane allocator 326 generates dynamic maps containing locations of transfer lanes for each transport vehicle involved in transfers. In this example, dynamic maps are updated dynamically as transfer lanes are placed, rearranged, and removed. Dynamic map sender 328 sends dynamic maps to transport vehicles involved in transfers. In this illustrative example, dynamic map sender 328 sends dynamic map 338 to autonomous vehicle 304 and dynamic map 346 to autonomous vehicle 306. In addition, dynamic map sender 328 can also send dynamic maps to other vehicles 330. These other vehicles can be vehicles not involved in the transport and transfer of passengers at the ad-hoc transport nodes. The instruction counts indicate that certain lanes on a road are not usable by vehicles not involved in the transfer passengers at the ad-hoc transport nodes.

Routing controller 332 in autonomous vehicle 304 is a component that controls the operation autonomous vehicle 304. The control of autonomous vehicle 304 can be performed using dynamic map 338 and route and schedule determined by vehicle route planner 316 for autonomous vehicle 304. In a similar fashion, routing controller 340 in autonomous vehicle 306 is a component that controls the operation of autonomous vehicle 306 using dynamic map 346 and route and schedule determined by vehicle route planner 316 for autonomous vehicle 306.

In this illustrative example, platoon controller 334 in autonomous vehicle 304 and platoon controller 342 in autonomous vehicle 306 work together to enable autonomous vehicle 304 and autonomous vehicle 306 travel side-by-side in a platoon within ad-hoc transport nodes such that passengers can transfer between these two autonomous vehicles while the autonomous vehicles are moving.

Further in this example, gate controller 336 in autonomous vehicle 304 and gate controller 344 in autonomous vehicle 306 work together to set up a passageway between autonomous vehicle 304 and autonomous vehicle 306 for passengers to safely transfer between these two autonomous vehicles. In one illustrative example, a passageway can be a ramp or walkway connecting vehicles involved in the transfer of passengers. The passageway includes safety features such as handrails, guardrails, and other features for passenger safety. In this illustrative example, gate controller 336 and gate controller 344 send notifications to transshipment notification unit 354 to inform passengers that autonomous vehicles are ready for transfer once safety passageway is established between autonomous vehicle 304 and autonomous vehicle 306.

Figure 4:
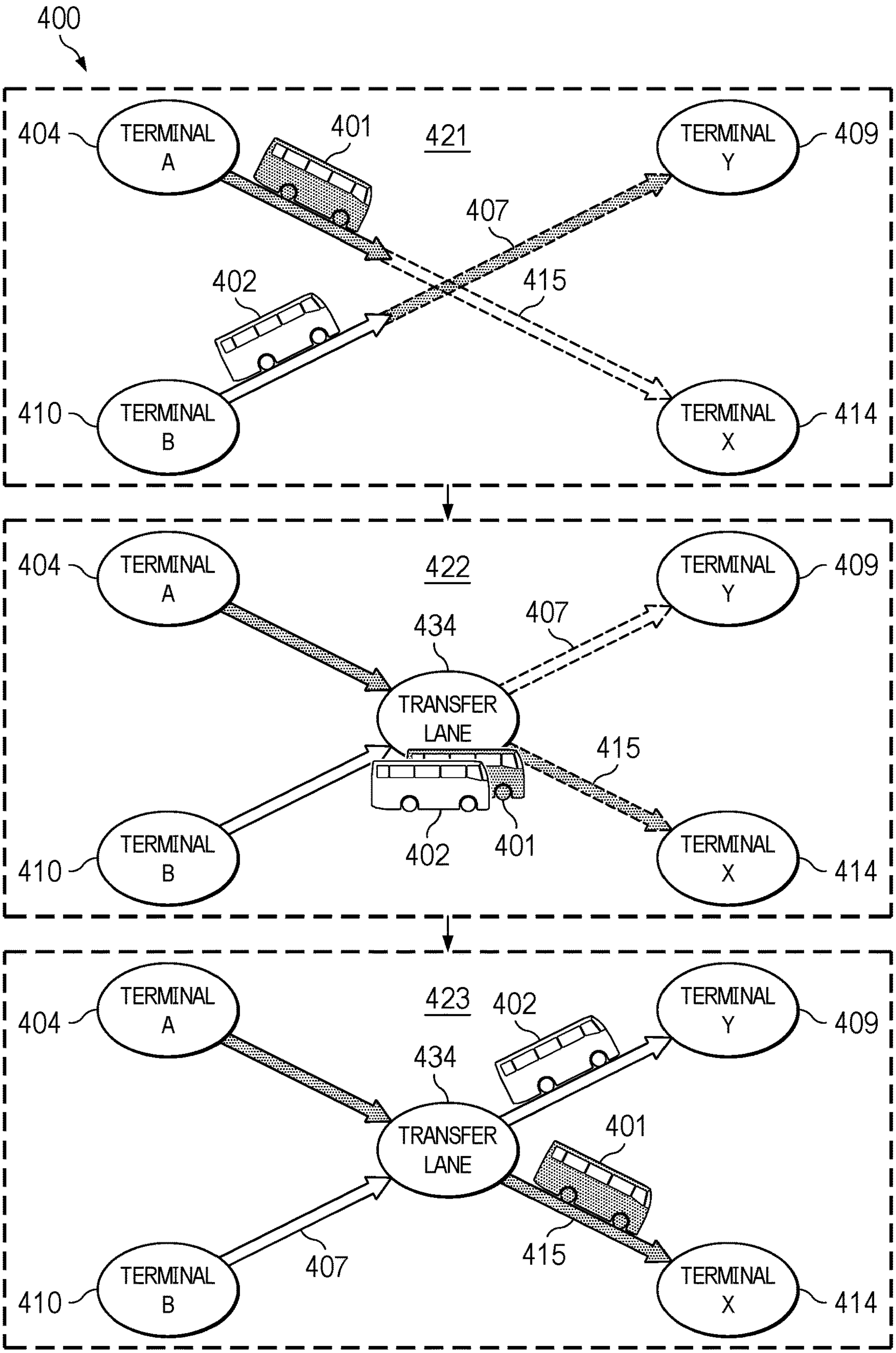
FIG. 4 is a transportation flow diagram for transferring passengers between two buses in accordance with an illustrative embodiment.

Turning to FIG. 4, a transportation flow diagram for transferring passengers between two buses is depicted in accordance with an illustrative embodiment. In this illustrative example, transportation flow diagram 400 illustrates a transfer of passengers between vehicles. In this example, the creation of the transfer lane and movement of passengers can be controlled by transport node manager 214 in computer system 212 in FIG. 2.

As depicted in first phase 421 of transportation flow diagram 400, first bus 401 is scheduled to leave terminal A 404 for terminal X 414 on route 407. Second bus 402 is scheduled to leave terminal B 410 for terminal Y 409 on route 415. In this example, terminal X 414 and terminal Y 409 are destinations for the buses.

In this illustrative example, passengers at terminal A 404 who wish to travel to either terminal Y 409 or terminal X 414 can board first bus 401. Further, passengers at terminal B 410 who wish to travel to either terminal Y 409 or terminal X 414 can board second bus 402.

In this illustrative example, based on these destinations for the passengers, a transfer lane can be defined at a location predicted for first bus 401 and second bus 402 to meet while traveling to their destinations such that these two transport vehicles can exchange passengers. In this example, the location is a location where route 407 and route 415 intersect each other.

In second phase 422 of transportation flow diagram 400, transfer lane 434 for an ad-hoc transport node is placed such that first bus 401 and second bus 402 can exchange passengers. Vehicles not involved in the transfer passengers are instructed not to use transfer lane 434.

In this example, first bus 401 and second bus 402 drive side-by-side in a platoon that enables passengers to transfer between these two buses while the buses are moving. For example, passengers on first bus 401 that have terminal Y 409 as a destination can transfer from first bus 401 to second bus 402. Passengers on second bus 402 that have terminal X 414 as a destination can transfer from second bus 402 to first bus 401.

In third phase 423 of transportation flow diagram 400, first bus 401 and second bus 402 left transfer lane 434 and are no longer driving in a platoon. Each bus continues on to its destination. For example, first bus 401 continues to terminal X 414 and second bus 402 continues to terminal Y 409. The transfer of passengers between these two buses result in the passengers reaching their desired destinations even though their original buses were not headed to their desired destinations. This type of transfer is performed without needing a physical facility such as a transport node.

Figure 5:
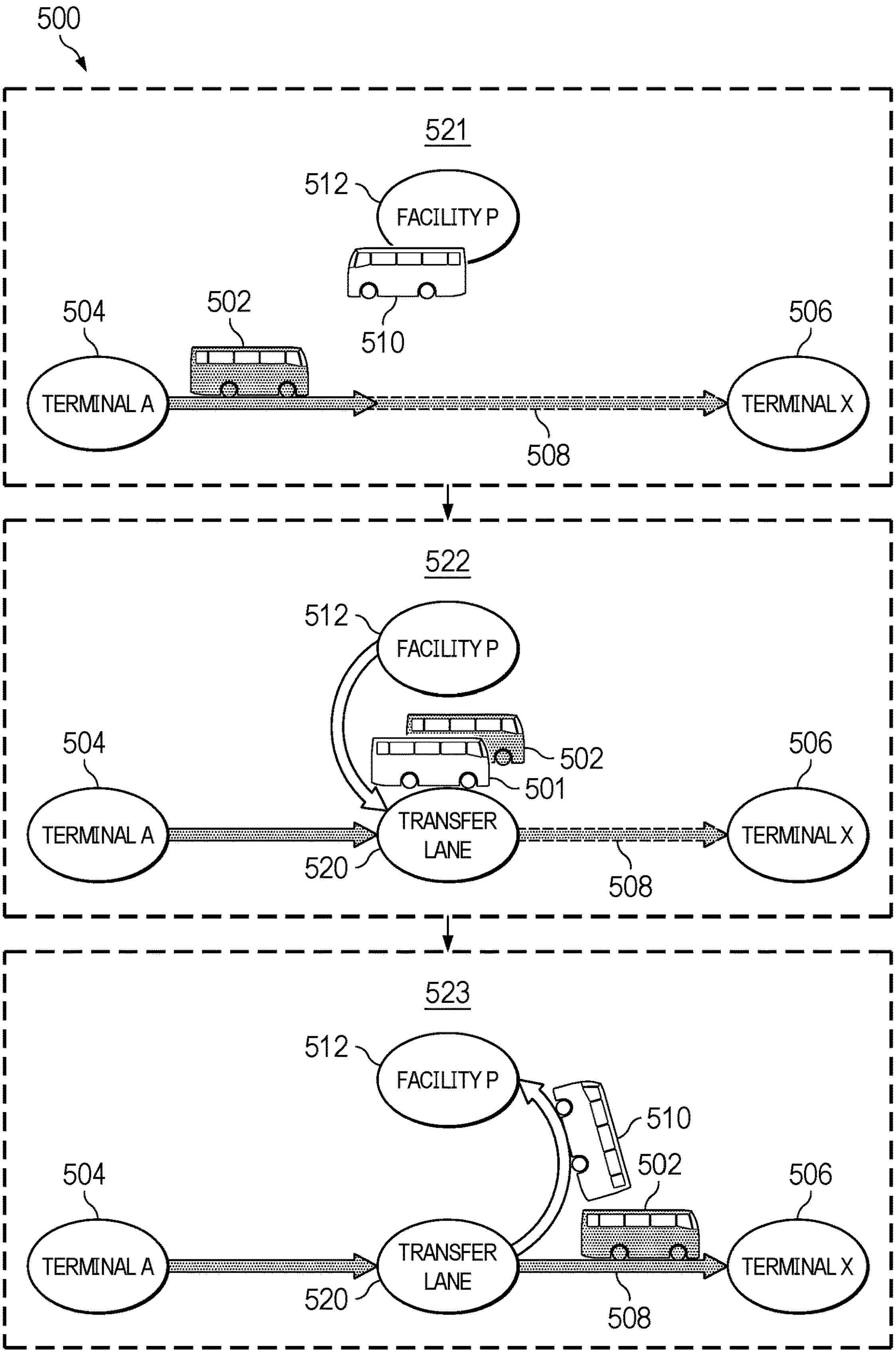
FIG. 5 is a transportation flow diagram for transferring passengers between a bus and a courtesy vehicle in accordance with an illustrative embodiment.

With reference now to FIG. 5, a transportation flow diagram for transferring passengers between a bus and a courtesy vehicle is depicted in accordance with an illustrative embodiment. In this illustrative example, transportation flow diagram 500 illustrates a transfer of passengers between vehicles. In this example, the creation of the transfer lane and movement of passengers can be controlled by transport node manager 214 in computer system 212 in FIG. 2.

In first phase 521 of transportation flow diagram 500, bus 502 leaves terminal A 504 for terminal X 506 on route 508. In this example, courtesy vehicle 510 is scheduled to leave facility P 512 with passengers who wish to reach terminal X 506. In this example, courtesy vehicle 510 can transfer passengers to bus 502 through the creation of a transfer lane for an ad-hoc transport node at a location along route 508.

In second phase 522 of transportation flow diagram 500, transfer lane 520 is created on route 508. Vehicles not involved in passenger transfer are instructed not to use transfer lane 520.

As depicted, courtesy vehicle 510 has reached transfer lane 520 prior to bus 502. In this example, courtesy vehicle 510 receives instructions to wait in transfer lane 520. When bus 502 approaches, courtesy vehicle 510 and bus 502 organize into a platoon in transfer lane 520 to transfer passengers between these courtesy vehicle 510 and bus 502. For example, passengers with a destination of terminal X 506 in courtesy vehicle 510 can transfer to bus 502. Further, any passengers and bus 502 having a destination of facility P 512 can transfer to courtesy vehicle 510.

Next in third phase 523 of transportation flow diagram 500, the transfer passengers are complete and the platoon is dissolved with courtesy vehicle 510 returning to facility P 512 and bus 502 continuing on route 508 to terminal X 506. Transfer lane 520 can then be removed such that other traffic can travel in that lane.

Figure 6:
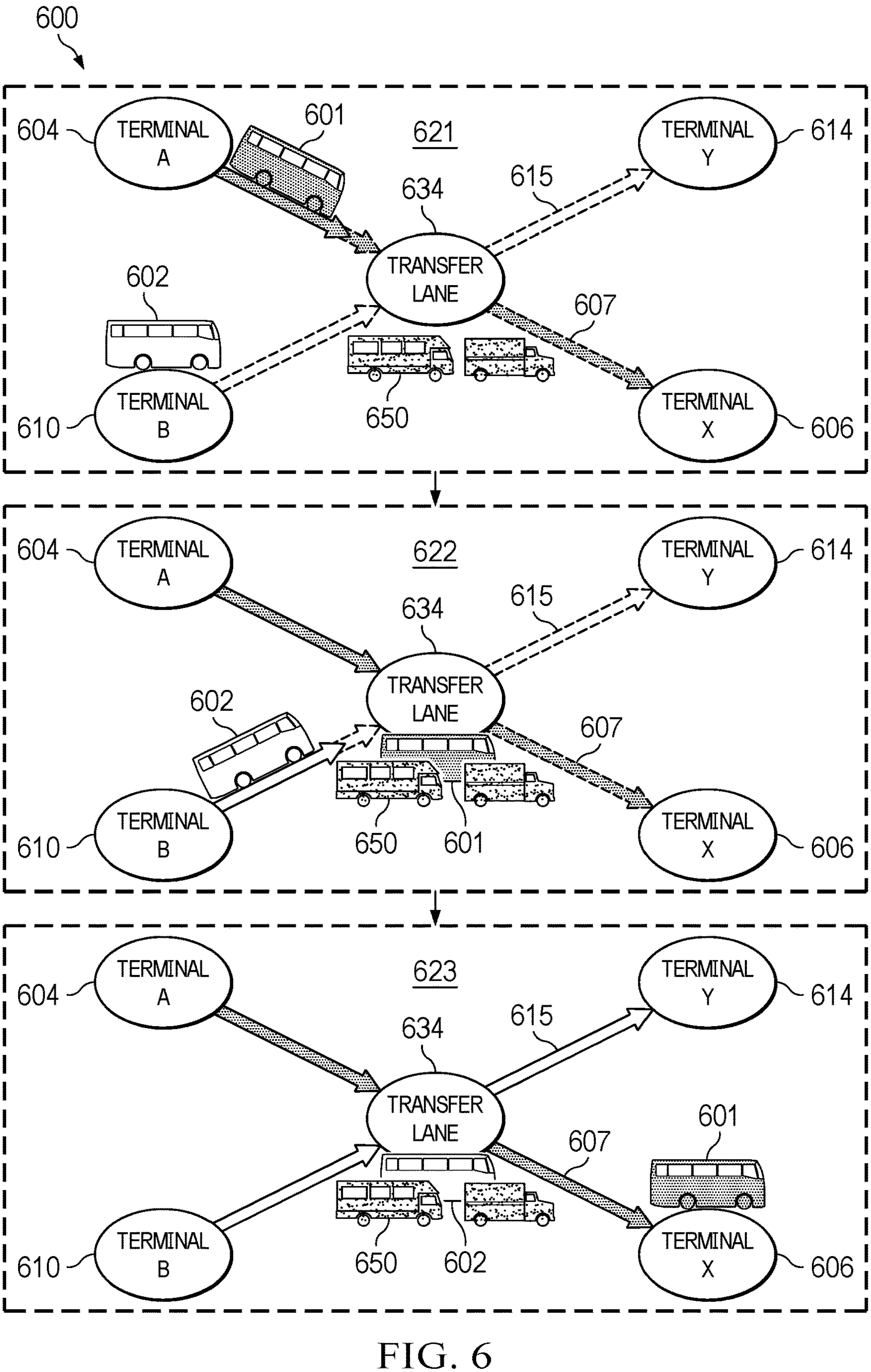
FIG. 6 is a transportation flow diagram for transferring passengers in a transfer lane with mobility vehicles in accordance with an illustrative embodiment.

In FIG. 6, a transportation flow diagram for transferring passengers in a transfer lane with mobility vehicles is depicted in accordance with an illustrative embodiment. In this illustrative example, transportation flow diagram 600 illustrates a transfer of passengers between transport vehicles to increase efficient use of passenger time. In this example, the creation of the transfer lane and movement of passengers can be controlled by transport node manager 214 in computer system 212 in FIG. 2.

As depicted in first phase 621 of transportation flow diagram 600, first bus 601 is scheduled to leave terminal A 604 for terminal X 606 on route 607 prior to second bus 602 leaving leave terminal B 610 for terminal Y 614 on route 615. In this example, passengers at terminal A 604 that wish to travel to either terminal Y 614 or terminal X 606 can board first bus 601. Further, passengers at terminal B 610 that wish to travel to either terminal Y 614 or terminal X 606 can board second bus 602.

In this illustrative example, transfer lane 634 is placed in a location where passengers can be exchanged. In this example, the location is a location where route 607 and route 615 intersect each other. In this example, mobility shops 650 are examples of mobility vehicles placed in transfer lane 634.

In second phase 622 of transportation flow diagram 600, second bus 602 leaves terminal B 610. First bus 601 reached transfer lane 434. With first bus 601 in transfer lane 634, passengers who have terminal Y 614 as a destination can transfer from first bus 601 to mobility shops 650. Passengers can wait in mobility shops 650 for the arrival of second bus 602.

Next in third phase 623 of transport flow diagram 600, first bus 601 has left and reached terminal X 606. Second bus 602 has reached transfer lane 634. Passengers in mobility shops 650 who have terminal Y 614 as a destination in transfer to second bus 602. Second bus 602 can then continue on route 615 to terminal Y 614.

Thus, transport vehicles do not have to meet at the same time at a transfer lane for an ad-hoc transport node to be able to transfer passengers to reach their destinations. In this example, mobility shops 650 allow for passengers to make efficient use of their time while they are waiting. Passengers can dine, shop, or perform other activities in mobility shops 650.

Figure 7:
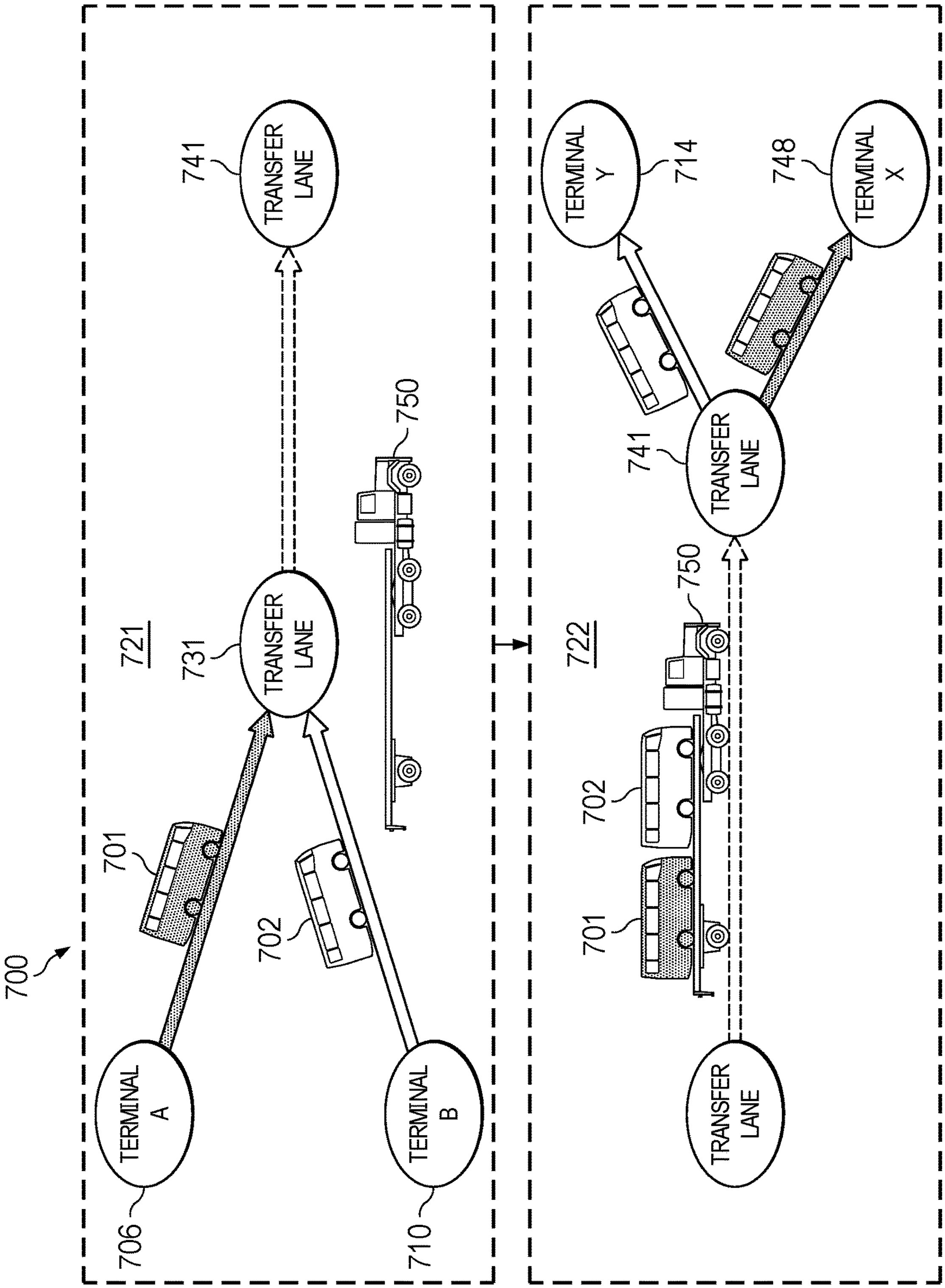
FIG. 7 is a transportation flow diagram for transferring passengers using a vehicle carrier in accordance with an illustrative embodiment.

With reference now to FIG. 7, a transportation flow diagram for transferring passengers using a vehicle carrier is depicted in accordance with an illustrative embodiment. In this illustrative example, transportation flow diagram 700 illustrates a transfer of passengers using a vehicle carrier. In this example, the creation of the transfer lane and movement of passengers can be controlled by transport node manager 214 in computer system 212 in FIG. 2.

In first phase 721 of transportation flow diagram 700, first bus 701 leaves terminal a 704, and second bus 702 leaves terminal B 710. Both buses move towards first transfer lane 731.

In this example, vehicle carrier 750 is located within first transfer lane 731 for a first ad-hoc transport node. Vehicle carrier 750 loads first bus 701 and second bus 702 in response to these buses entering first transfer lane 731. In this example, vehicle carrier 750 will travel to second transfer lane 741 from first transfer lane 731 in response to loading both buses onto vehicle carrier 750.

In second phase 722 of transportation flow diagram 700, vehicle carrier 750 leaves for second transfer lane 741 With both buses being loaded on vehicle carrier 750. Passengers can transfer between buses while vehicle carrier 750 is traveling towards second transfer lane 741. Both buses are unloaded from vehicle carrier 750 in second transfer lane and continue traveling to their destinations. In this example, first bus 701 travels to terminal X 708, and second bus 702 trip travels to terminal Y 714.

The transportation flow diagrams in FIGS. 4-7 are provided as some examples for transferring passengers that can be performed using transport node manager 214 in transport management system 202 in FIG. 2. These illustrations are not meant to limit the manner in which other illustrative examples can be implemented. For example, vehicle carrier 750 can be moving within first transfer lane 731 while first bus 701 and second bus 702 are loaded onto vehicle carrier 750.

In still other illustrative examples, only a single transfer lane is needed. For example, first transfer lane 731 can move while vehicle carrier 750 travel and passengers are transferred between buses. This use of first transfer lane 731 can enable a slower lane for passenger transfer as compared to normal means. In yet another illustrative example, the transfer of passengers between buses and mobility shops form while the different vehicles are moving as a platoon. With this example, the transfer lane can also move along the road. In other words, in some examples, the vehicles can continue to move while passengers transfer between transport vehicles. In other examples, one or more transfer vehicles can wait within a transfer lane for another transport vehicle to perform passenger transfers. In yet other illustrative examples, vehicle carrier 750 can take other forms such as a railway freight train for a cargo vessel in addition to the road vehicle shown from vehicle carrier 750.

In another illustrative example, the transfer can be performed for loads in addition to or in place of passengers. For example, transfers of cargo objects can also be performed in the different illustrative examples.

Figure 8:
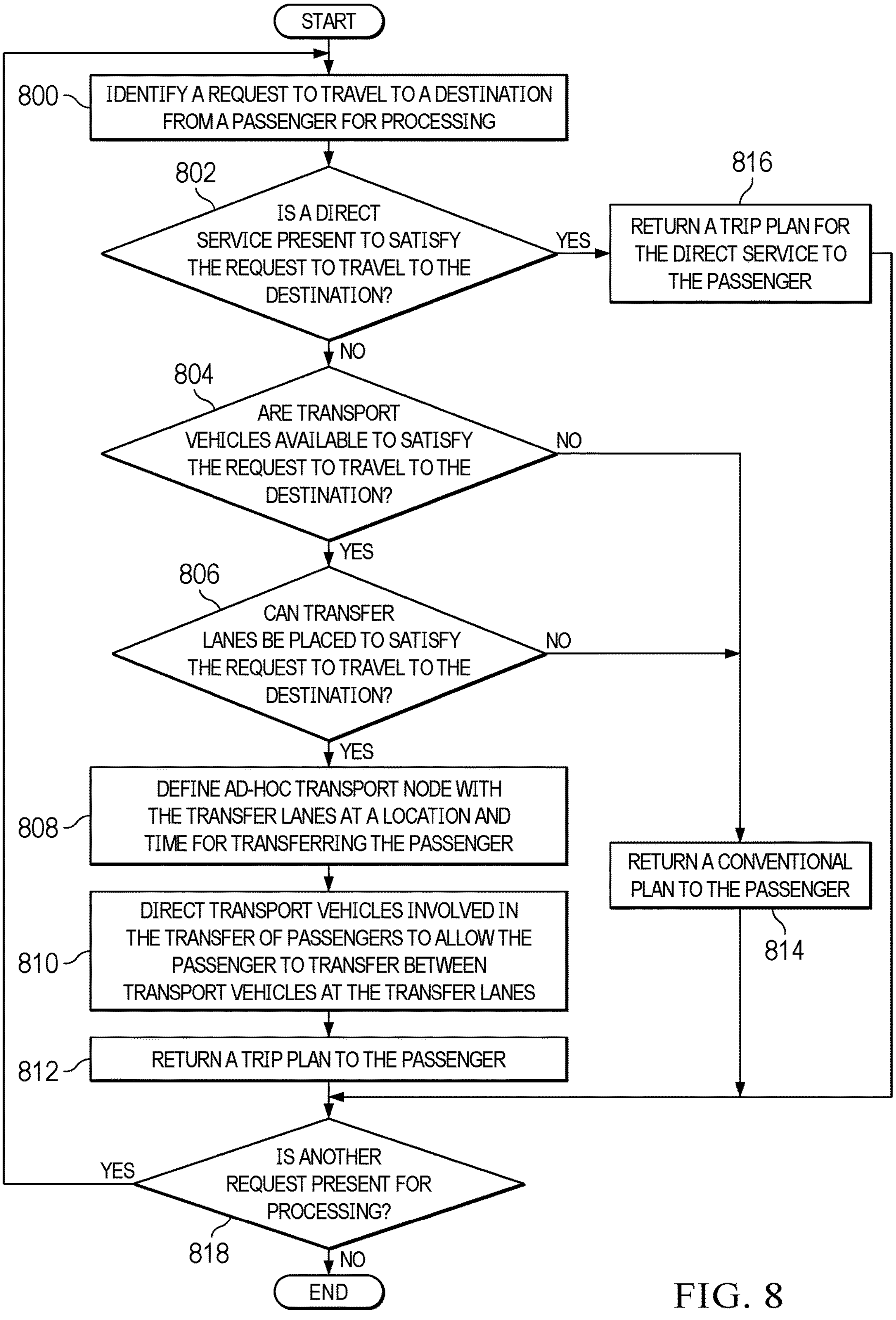
FIG. 8 is a flowchart of a process for managing passenger travel in accordance with an illustrative embodiment.

Turning next to FIG. 8, a flowchart of a process for managing passenger travel is depicted in accordance with an illustrative embodiment. The process in FIG. 8 can be implemented in hardware, software, or both. When implemented in software, the process can take the form of program instructions that are run by one of more processor units located in one or more hardware devices in one or more computer systems. For example, the process can be implemented in transport node manager 214 in computer system 212 in FIG. 2.

In this illustrative example, the process begins by identifying a request to travel to a destination from a passenger for processing (step 800). The process determines whether a direct service is present to satisfy the request to travel to the destination (step 802). In step 802, the direct service means that the passenger can travel from origination or start location to the destination location without needing to change transport vehicles. In some cases, the request can occur while the customer is already traveling, and the start location is the current location of the passenger in the transport vehicle.

If a direct service is not present to satisfy the request to travel to the destination, transfer, the process proceeds to determine whether transport vehicles are available to satisfy the request to travel to the destination (step 804). In one example, this determination can include determining whether transport vehicles are available to transfer the passenger between transport vehicles to enable the passenger to reach the desired destination the current location. In another example, the process can also reroute transport vehicles from transport vehicles' planned routes to enable transferring vehicles at ad-hoc transport location.

If transport vehicles are available, the process determines whether transfer lanes for an ad-hoc transport node can be placed along the route for the transport vehicles to transfer the passenger (step 806). As depicted, the transfer lanes form an ad-hoc transport node provided a location for transport vehicles exchanging passengers while traveling to destination locations.

If the transfer lanes can be placed for the transfer, the process defines ad-hoc transport node with the transfer lanes at a location and time for the transfer (step 808). In this illustrative example, the location can be a common place on routes for all vehicles involved in the transfer. The process directs transport vehicles involved in the transfer of passengers to allow the passengers to transfer between vehicles at the transfer lanes (step 810).

The process returns a trip plan to the passenger (step 812). In step 812, the trip plan shows the passenger how the transfer can be accomplished. For example, the trip plan is an itinerary that can include information about departure time, departure location, transfer location, transfer time, and other information.

The process determines whether another request is present for processing (step 818). If another request is present, the process returns to step 800. With reference again to step 802, if the direct service is present to satisfy the request for the transfer, the process returns a trip plan for the direct service to the passenger (step 816).

With reference again to step 806, if the transfer lanes cannot be placed for the transfer, the process proceeds to return a conventional plan for the transfer to the passenger (step 814). With reference again to step 804, if no transport vehicles are available to satisfy the request for the transfer from the passenger, the process also proceeds to step 814. In step 814, the conventional plan is a trip plan that shows how the transfer can be accomplished using conventional planning such as travel to permanent transport nodes and routing processes. This type of conventional planning may increase the length of time of travel for passengers as compared to using ad-hoc transport nodes in the different illustrative examples.

The process also proceeds to step 818 to determine whether another request is present for processing. In step 818, if another request is present for processing, the process returns to step 800, and repeats step 800 to step 818 until all requests have been processed. On the other hand, if all requests have been processed, the process terminates thereafter.

In step 818, the process can determine whether another request for the transfer from the passenger is present for processing. In an alternative example, the process can determine whether another request for a different transfer from the passenger is present for processing. In yet another example, the process can also determine whether another request from a different passenger is present for processing.

It should be understood that implementation of processing a request for a transfer from a passenger depicted in FIG. 8 is only one embodiment of instant disclosure, the process for handling requests for transfers can also be implemented in other architectures. For example, the process can handle multiple requests from different passengers for the same transfer or different transfers simultaneously by processing all requests in parallel.

Figure 9:
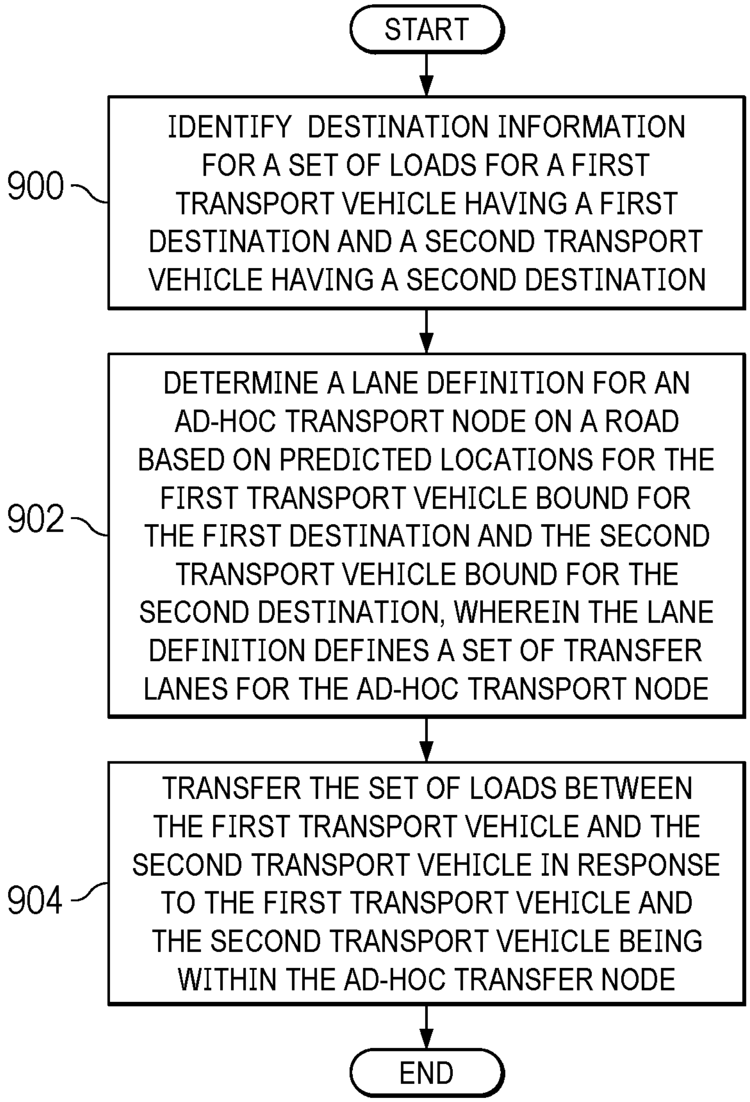
FIG. 9 is a flowchart of a process for transshipping in accordance with an illustrative embodiment.

Turning next to FIG. 9, a flowchart of a process for transshipping is depicted in accordance with an illustrative embodiment. The process in FIG. 9 can be implemented in hardware, software, or both. When implemented in software, the process can take the form of program instructions that are run by one of more processor units located in one or more hardware devices in one or more computer systems. For example, the process can be implemented in transport node manager 214 in computer system 212 in FIG. 2.

The process begins by identifying destination information for a set of loads for a first transport vehicle having a first destination and a second transport vehicle having a second destination (step 900). The process determines a lane definition for an ad-hoc transport node on a road based on predicted locations for the first transport vehicle bound for the first destination and the second transport vehicle bound for the second destination, wherein the lane definition defines a set of transfer lanes for the ad-hoc transport node (step 902).

The process transfers the set of loads between the first transport vehicle and the second transport vehicle in response to the first transport vehicle and the second transport vehicle being within the ad-hoc transport node (step 904). The process terminates thereafter.

Figure 10:
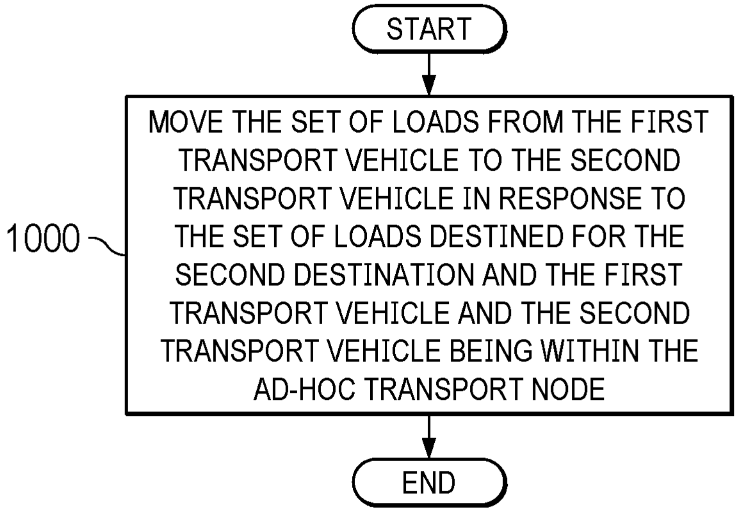
FIG. 10 is a flowchart of a process for transferring loads in accordance with an illustrative embodiment.

With reference next to FIG. 10, a flowchart of a process for transferring loads is depicted in accordance with an illustrative embodiment. The process depicted in this figure is an example of an implementation for step 904 in FIG. 9.

The process moves the set of loads from the first transport vehicle to the second transport vehicle in response to the set of loads destined for the second destination and the first transport vehicle and the second transport vehicle being within the ad-hoc transport node (step 1000). The process terminates thereafter.

Figure 11:
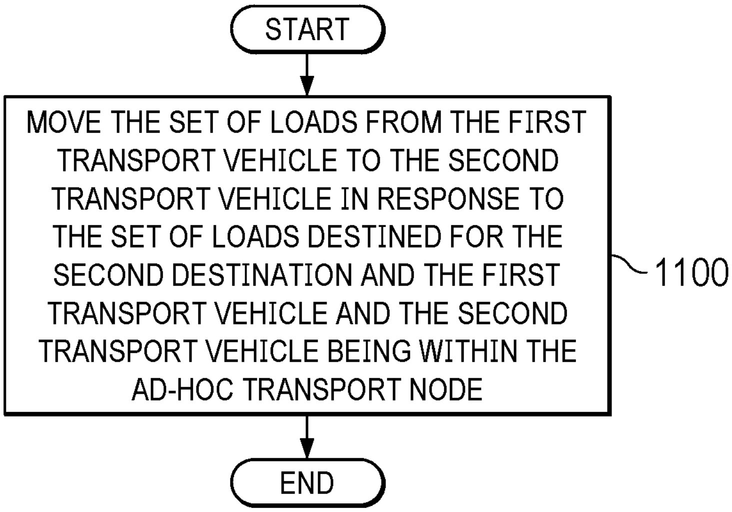
FIG. 11 is another flowchart of a process for transferring loads in accordance with an illustrative embodiment.

Next in FIG. 11, another flowchart of a process for transferring loads is depicted in accordance with an illustrative embodiment. The process depicted in this figure is an example of an implementation for step 904 in FIG. 9.

The process moves the set of loads from the second transport vehicle to the first transport vehicle in response to the set of loads being destined for the first destination and the first transport vehicle and the second transport vehicle being within the ad-hoc transport node (step 1100). The process terminates thereafter.

Figure 12:
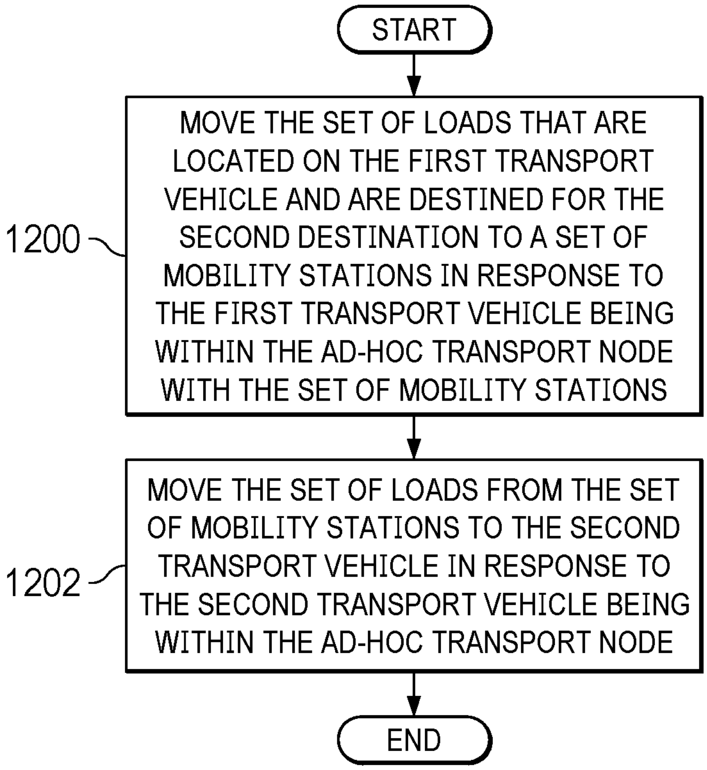
FIG. 12 is yet another flowchart of a process for transferring loads in accordance with an illustrative embodiment.

Turning to FIG. 12, yet another flowchart of a process for transferring loads is depicted in accordance with an illustrative embodiment. The process depicted in this figure is an example of an implementation for step 904 in FIG. 9.

The process moves the set of loads that are located on the first transport vehicle and are destined for the second destination to a set of mobility stations in response to the first transport vehicle being within the ad-hoc transport node with the set of mobility stations (step 1200). The process moves the set of loads from the set of mobility stations to the second transport vehicle in response to the second transport vehicle being within the ad-hoc transport node (step 1202). The process terminates thereafter.

Figure 13:
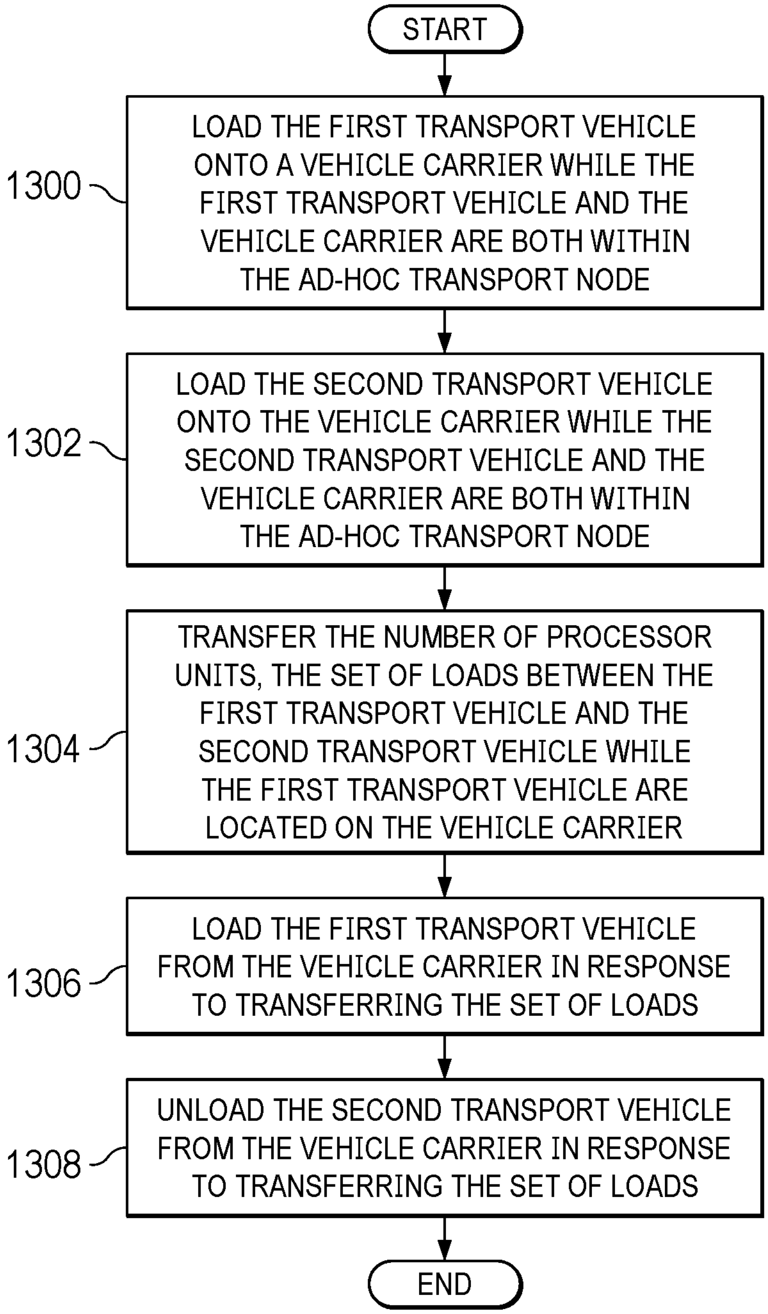
FIG. 13 is a flowchart of a process for transferring loads in accordance with an illustrative embodiment.

With reference now to FIG. 13, a flowchart of a process for transferring loads is depicted in accordance with an illustrative embodiment. The process depicted in this figure is an example of an implementation for step 904 in FIG. 9.

The process begins by loading the first transport vehicle onto a vehicle carrier while the first transport vehicle and the vehicle carrier are both within the ad-hoc transport node (step 1300). The process loads the second transport vehicle onto the vehicle carrier while the second transport vehicle and the vehicle carrier are both within the ad-hoc transport node (step 1302). The process transfers the number of processor units, the set of loads between the first transport vehicle and the second transport vehicle while the first transport vehicle and the second transport vehicle are located on the vehicle carrier (step 1304).

The process loads the first transport vehicle from the vehicle carrier in response to transferring the set of loads (step 1306). The process unloads the second transport vehicle from the vehicle carrier in response to transferring the set of loads (step 1308). The process terminates thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks can be implemented as program instructions, hardware, or a combination of the program instructions and hardware. When implemented in hardware, the hardware may, for example, take the form of integrated circuits that are manufactured or configured to perform one or more operations in the flowcharts or block diagrams. When implemented as a combination of program instructions and hardware, the implementation may take the form of firmware. Each block in the flowcharts or the block diagrams can be implemented using special purpose hardware systems that perform the different operations or combinations of special purpose hardware and program instructions run by the special purpose hardware.

In some alternative implementations of an illustrative embodiment, the function or functions noted in the blocks may occur out of the order noted in the figures. For example, in some cases, two blocks shown in succession can be performed substantially concurrently, or the blocks may sometimes be performed in the reverse order, depending upon the functionality involved. Also, other blocks can be added in addition to the illustrated blocks in a flowchart or block diagram.

Figure 14:
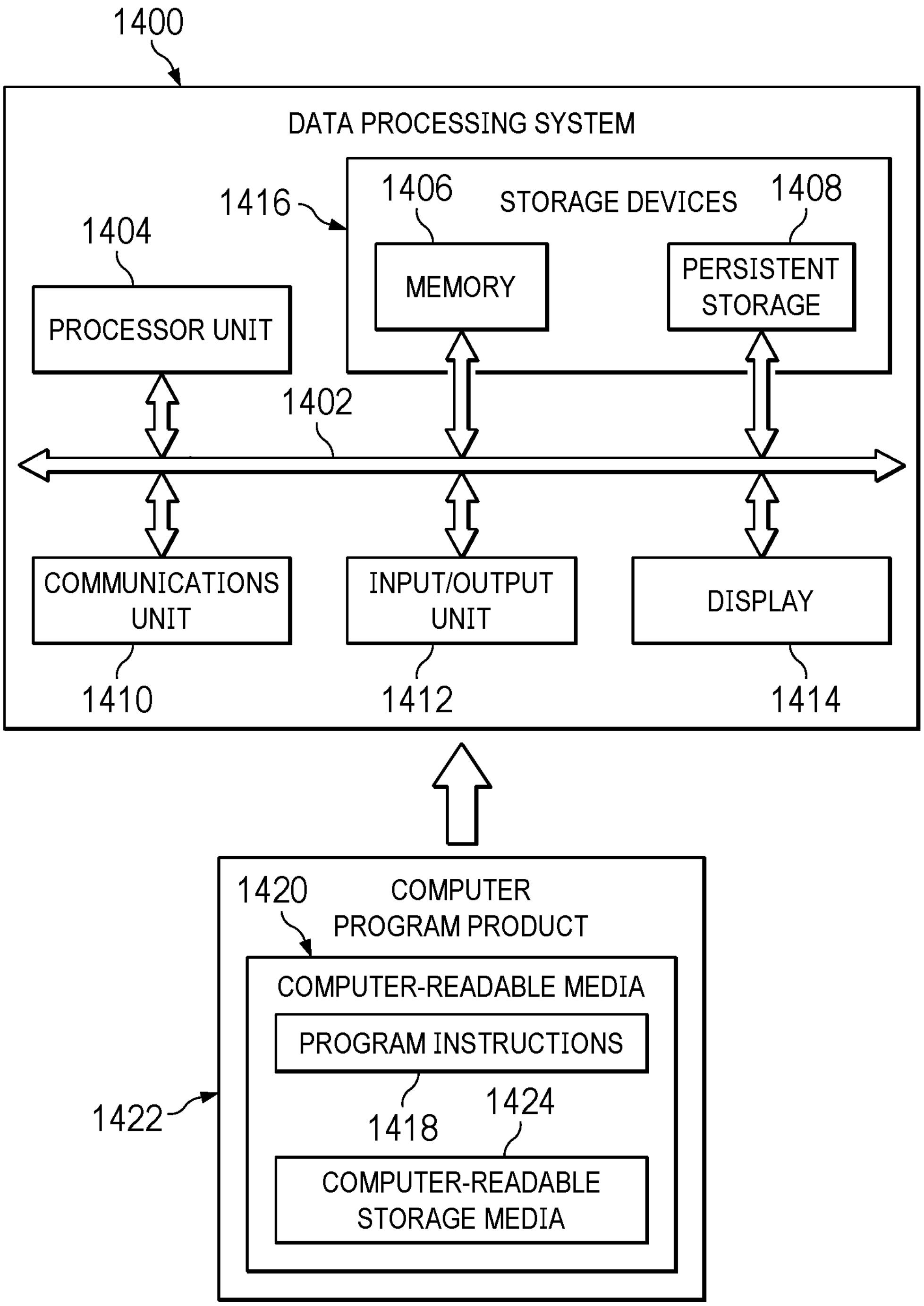
FIG. 14 is a block diagram of a data processing system in accordance with an illustrative embodiment.

Turning now to FIG. 14, a block diagram of a data processing system is depicted in accordance with an illustrative embodiment. Data processing system 1400 can be used to implement computers and computing devices in computing environment 100 in FIG. 1. Data processing system 1400 can also be used to implement computer system 212 in FIG. 2. In this illustrative example, data processing system 1400 includes communications framework 1402, which provides communications between processor unit 1404, memory 1406, persistent storage 1408, communications unit 1410, input/output (I/O) unit 1412, and display 1414. In this example, communications framework 1402 takes the form of a bus system.

Processor unit 1404 serves to execute instructions for software that can be loaded into memory 1406. Processor unit 1404 includes one or more processors. For example, processor unit 1404 can be selected from at least one of a multicore processor, a central processing unit (CPU), a graphics processing unit (GPU), a physics processing unit (PPU), a digital signal processor (DSP), a network processor, or some other suitable type of processor. Further, processor unit 1404 can be implemented using one or more heterogeneous processor systems in which a main processor is present with secondary processors on a single chip. As another illustrative example, processor unit 1404 can be a symmetric multi-processor system containing multiple processors of the same type on a single chip.

Memory 1406 and persistent storage 1408 are examples of storage devices 1416. A storage device is any piece of hardware that is capable of storing information, such as, for example, without limitation, at least one of data, program instructions in functional form, or other suitable information either on a temporary basis, a permanent basis, or both on a temporary basis and a permanent basis. Storage devices 1416 may also be referred to as computer readable storage devices in these illustrative examples. Memory 1406, in these examples, can be, for example, a random-access memory or any other suitable volatile or non-volatile storage device. Persistent storage 1408 may take various forms, depending on the particular implementation.

For example, persistent storage 1408 may contain one or more components or devices. For example, persistent storage 1408 can be a hard drive, a solid-state drive (SSD), a flash memory, a rewritable optical disk, a rewritable magnetic tape, or some combination of the above. The media used by persistent storage 1408 also can be removable. For example, a removable hard drive can be used for persistent storage 1408.

Communications unit 1410, in these illustrative examples, provides for communications with other data processing systems or devices. In these illustrative examples, communications unit 1410 is a network interface card.

Input/output unit 1412 allows for input and output of data with other devices that can be connected to data processing system 1400. For example, input/output unit 1412 may provide a connection for user input through at least one of a keyboard, a mouse, or some other suitable input device. Further, input/output unit 1412 may send output to a printer. Display 1414 provides a mechanism to display information to a user.

Instructions for at least one of the operating system, applications, or programs can be located in storage devices 1416, which are in communication with processor unit 1404 through communications framework 1402. The processes of the different embodiments can be performed by processor unit 1404 using computer-implemented instructions, which may be located in a memory, such as memory 1406.

These instructions are referred to as program instructions, computer usable program instructions, or computer readable program instructions that can be read and executed by a processor in processor unit 1404. The program instructions in the different embodiments can be embodied on different physical or computer readable storage media, such as memory 1406 or persistent storage 1408.

Program instructions 1418 are located in a functional form on computer readable media 1420 that is selectively removable and can be loaded onto or transferred to data processing system 1400 for execution by processor unit 1404. Program instructions 1418 and computer readable media 1420 form computer program product 1422 in these illustrative examples. In the illustrative example, computer readable media 1420 is computer readable storage media 1424.

Computer readable storage media 1424 is a physical or tangible storage device used to store program instructions 1418 rather than a medium that propagates or transmits program instructions 1418. Computer readable storage media 1424, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Alternatively, program instructions 1418 can be transferred to data processing system 1400 using a computer readable signal media. The computer readable signal media are signals and can be, for example, a propagated data signal containing program instructions 1418. For example, the computer readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

Further, as used herein, "computer readable media 1420" can be singular or plural. For example, program instructions 1418 can be located in computer readable media 1420 in the form of a single storage device or system. In another example, program instructions 1418 can be located in computer readable media 1420 that is distributed in multiple data processing systems. In other words, some instructions in program instructions 1418 can be located in one data processing system while other instructions in program instructions 1418 can be located in one data processing system. For example, a portion of program instructions 1418 can be located in computer readable media 1420 in a server computer while another portion of program instructions 1418 can be located in computer readable media 1420 located in a set of client computers.

The different components illustrated for data processing system 1400 are not meant to provide architectural limitations to the manner in which different embodiments can be implemented. In some illustrative examples, one or more of the components may be incorporated in or otherwise form a portion of, another component. For example, memory 1406, or portions thereof, may be incorporated in processor unit 1404 in some illustrative examples. The different illustrative embodiments can be implemented in a data processing system including components in addition to or in place of those illustrated for data processing system 1400. Other components shown in FIG. 14 can be varied from the illustrative examples shown. The different embodiments can be implemented using any hardware device or system capable of running program instructions 1418.

Thus, illustrative embodiments provide a computer implemented method, computer system, and computer program product for transshipping. In one illustrative example, a number of processor units identifies destination information for a load for a first transport vehicle having a first destination and a second transport vehicle having a second destination. The number of processor units determines a lane definition for an ad-hoc transport node on a road based on predicted locations for the first transport vehicle bound for the first destination and the second transport vehicle bound for the second destination. The lane definition defines a set of transfer lanes for the ad-hoc transport node. The number of processor units transfers the load between the first transport vehicle and the second transport vehicle in response to the first transport vehicle and the second transport vehicle being within the ad-hoc transport node.

The illustrative examples overcome issues with dedicated transport nodes in fixed locations. Issues with expense and maintenance for building and maintaining dedicated transport nodes can be overcome using the use of ad-hoc transport nodes in the different illustrative examples. Ad-hoc transport nodes can provide temporary locations for transferring passengers between transport vehicles. These ad-hoc transport nodes can be generated using lanes on roadways. Further, ad-hoc transport nodes are dynamic and can move while they are present for transporting passengers. Further, these ad-hoc transport nodes can be removed after passengers have been transferred between transport vehicles.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, to the extent that terms "includes", "including", "has", "contains", and variants thereof are used herein, such terms are intended to be inclusive in a manner similar to the term "comprises" as an open transition word without precluding any additional or other elements.

The descriptions of the various embodiments of the present invention have been presented for purposes of illustration, but are not intended to be exhaustive or limited to the embodiments disclosed. Not all embodiments will include all of the features described in the illustrative examples. Further, different illustrative embodiments may provide different features as compared to other illustrative embodiments. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

What is claimed is:

1. A computer implemented method for transshipping, the computer implemented method comprising:

identifying, by a number of processor units, destination information for a set of loads for a first transport vehicle having a first destination and a second transport vehicle having a second destination;

determining, by the number of processor units, a temporary lane definition for an ad-hoc transport node on a road based on predicted locations for the first transport vehicle bound for the first destination and the second transport vehicle bound for the second destination, wherein the temporary lane definition defines a set of transfer lanes for the ad-hoc transport node, wherein the transfer lanes move dynamically along the road at a specified speed and wherein the temporary lane definition comprises a dynamic allocation of a portion of the road for a limited time period and wherein the temporary lane definition is broadcast as a dynamic map to road users prohibiting non-participating vehicles from entering the set of transfer lanes while the temporary lane definition is active and releasing the portion of the road upon expiration of the limited time period;

loading, by the number of processor units, the first transport vehicle onto a vehicle carrier while the first transport vehicle and the vehicle carrier are both within the ad-hoc transport node;

loading, by the number of processor units, the second transport vehicle onto the vehicle carrier while the second transport vehicle and the vehicle carrier are both within the ad-hoc transport node;

transferring, by the number of processor units, the set of loads between the first transport vehicle and the second transport vehicle while the first transport vehicle and the second transport vehicle are located on the vehicle carrier in response to the first transport vehicle and the second transport vehicle being within the ad-hoc transport node;

unloading, by the number of processor units, the first transport vehicle from the vehicle carrier in response to transferring the set of loads; and unloading, by the number of processor units, the second transport vehicle from the vehicle carrier in response to transferring the set of loads.

2. The computer implemented method of claim 1, wherein vehicles not involved in transferring set of loads are prohibited from using the set of transfer lanes in response to the temporary lane definition being active.

3. The computer implemented method of claim 1, wherein vehicles not involved in transferring set of loads are allowed to use the set of transfer lanes in response to the temporary lane definition not being active.

4. The computer implemented method of claim 1, wherein the first transport vehicle and the second transport vehicle are selected from at least one of an autonomous vehicle, a truck, a bus, a city bus, a long distance bus, a coach, a courtesy car, a van, a minibus, or a tram.

5. The computer implemented method of claim 1, wherein the set of transfer lanes defined for the ad-hoc transport node are dynamic and change position over time, and wherein a dynamic allocator generates and sends dynamic maps containing locations of the transfer lanes to the first transport vehicle and second transport vehicle, and wherein the dynamic maps are updated dynamically as transfer lanes are placed, rearranged, and removed.

6. A computer system comprising:

a number of processor units, wherein the number of processor units executes program instructions to:

identify destination information for a set of loads for a first transport vehicle having a first destination and a second transport vehicle having a second destination;

determine a temporary lane definition for an ad-hoc transport node on a road based on predicted locations for the first transport vehicle bound for the first destination and the second transport vehicle bound for the second destination, wherein the temporary lane definition defines a set of transfer lanes for the ad-hoc transport node, wherein the transfer lanes move dynamically along the road at a specified speed, and wherein the temporary lane definition comprises a dynamic allocation of a portion of the road for a limited time period and wherein the temporary lane definition is broadcast as a dynamic map to road users prohibiting non-participating vehicles from entering the set of transfer lanes while the temporary lane definition is active and releasing the portion of the road upon expiration of the limited time period;

load the first transport vehicle onto a vehicle carrier while the first transport vehicle and the vehicle carrier are both within the ad-hoc transport node;

load the second transport vehicle onto the vehicle carrier while the second transport vehicle and the vehicle carrier are both within the ad-hoc transport node;

transfer the set of loads between the first transport vehicle and the second transport vehicle while the first transport vehicle and the second transport vehicle are located on the vehicle carrier in response to the first transport vehicle and the second transport vehicle being within the ad-hoc transport node;

unload the first transport vehicle from the vehicle carrier in response to transferring the set of loads; and unload the second transport vehicle from the vehicle carrier in response to transferring the set of loads.

7. The computer system of claim 6, wherein the set of transfer lanes defined for the ad-hoc transport node are dynamic and change position over time, and wherein a dynamic allocator generates and sends dynamic maps containing locations of the transfer lanes to the first transport vehicle and second transport vehicle, and wherein the dynamic maps are updated dynamically as transfer lanes are placed, rearranged, and removed.

8. A computer program product for transshipping, the computer program product comprising a non-transitory computer readable storage medium having program instructions embodied therewith, the program instructions executable by a computer system to cause the computer system to:

obtain destination information for a set of loads for a first transport vehicle having a first destination and a second transport vehicle having a second destination;

determine a temporary lane definition for an ad-hoc transport node on a road based on predicted locations for the first transport vehicle bound for the first destination and the second transport vehicle bound for the second destination, wherein the temporary lane definition defines a set of transfer lanes for the ad-hoc transport node, wherein the transfer lanes move dynamically along the road at a specified speed, and wherein the temporary lane definition comprises a dynamic allocation of a portion of the road for a limited time period and wherein the temporary lane definition is broadcast as a dynamic map to road users prohibiting non-participating vehicles from entering the set of transfer lanes while the temporary lane definition is active and releasing the portion of the road upon expiration of the limited time period;

load, by the number of processor units, the first transport vehicle onto a vehicle carrier while the first transport vehicle and the vehicle carrier are both within the ad-hoc transport node;

load, by the number of processor units, the second transport vehicle onto the vehicle carrier while the second transport vehicle and the vehicle carrier are both within the ad-hoc transport node;

transfer the set of loads between the first transport vehicle and the second transport vehicle while the first transport vehicle and the second transport vehicle are located on the vehicle carrier in response to the first transport vehicle and the second transport vehicle being within the ad-hoc transport node;

unload, by the number of processor units, the first transport vehicle from the vehicle carrier in response to transferring the set of loads; and unload, by the number of processor units, the second transport vehicle from the vehicle carrier in response to transferring the set of loads.

9. The computer implemented method of claim 1, wherein the temporary lane definition specifies a target speed for the set of transfer lanes that is based on the predicted speed of at least one of the first transport vehicle or the second transport vehicle, and wherein transferring the set of loads comprises coordinating the first transport vehicle and the second transport vehicle to travel as a platoon within the set of transfer lanes while the temporary lane definition is active.

10. The computer implemented method of claim 1, wherein the vehicle carrier comprises a flatbed with a ramp that enables loading and unloading of the first transport vehicle and the second transport vehicle while the vehicle carrier is moving.

11. The computer implemented method of claim 1, wherein the vehicle carrier moves at a speed coordinated with the first transport vehicle and the second transport vehicle to facilitate loading while all three vehicles are in motion.

12. The computer implemented method of claim 1, further comprising: synchronizing speeds of the first transport vehicle, the second transport vehicle, and the vehicle carrier while loading, transferring, and unloading operations occur.

13. The computer implemented method of claim 1, wherein the temporary lane definition is determined to accommodate a predicted time window during which the first transport vehicle and the second transport vehicle will both be available for transfer operations.

14. The computer implemented method of claim 1, wherein the ad-hoc transport node is established only for a duration sufficient to complete the transfer of the set of loads.

15. The computer implemented method of claim 1, wherein determining the temporary lane definition includes calculating an optimal location on the road where the first transport vehicle and the second transport vehicle will converge based on their respective routes and speeds.

16. The computer implemented method of claim 1, wherein the dynamic map includes real-time position information for the set of transfer lanes and is continuously broadcast to road users as the transfer lanes move along the road.

17. The computer implemented method of claim 1, further comprising: monitoring positions of the first transport vehicle, the second transport vehicle, and the vehicle carrier to ensure all three remain within the set of transfer lanes during loading, transferring, and unloading operations.

18. The computer system of claim 6, wherein the vehicle carrier comprises a flatbed with a ramp that enables loading and unloading of the first transport vehicle and the second transport vehicle while the vehicle carrier is moving.

19. The computer system of claim 6, wherein the vehicle carrier moves at a speed coordinated with the first transport vehicle and the second transport vehicle to facilitate loading while all three vehicles are in motion.

20. The computer system of claim 6, wherein the number of processor units further executes program instructions to: synchronize speeds of the first transport vehicle, the second transport vehicle, and the vehicle carrier while loading, transferring, and unloading operations occur.

* * * * *